United States Patent
Katz et al.

(10) Patent No.: US 12,368,960 B2
(45) Date of Patent: Jul. 22, 2025

(54) SYSTEMS AND METHODS FOR ZOOM DIGITAL CAMERA WITH AUTOMATIC ADJUSTABLE ZOOM FIELD OF VIEW

(71) Applicant: Corephotonics Ltd., Tel Aviv (IL)

(72) Inventors: Ruthy Katz, Tel Aviv (IL); Gal Shabtay, Tel Aviv (IL); Noy Cohen, Tel Aviv (IL); Gal Adler, Tel Aviv (IL); Adi Teitel, Tel Aviv (IL); Adi Falik, Tel Aviv (IL); Dana Deutsch, Tel Aviv (IL); Aviad Ofek, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/577,259

(22) PCT Filed: Aug. 3, 2023

(86) PCT No.: PCT/IB2023/057878
§ 371 (c)(1),
(2) Date: Jan. 7, 2024

(87) PCT Pub. No.: WO2024/028811
PCT Pub. Date: Feb. 8, 2024

(65) Prior Publication Data
US 2024/0267627 A1   Aug. 8, 2024

Related U.S. Application Data

(60) Provisional application No. 63/395,362, filed on Aug. 5, 2022.

(51) Int. Cl.
*H04N 23/69* (2023.01)
*G06V 10/25* (2022.01)
(Continued)

(52) U.S. Cl.
CPC ............. *H04N 23/69* (2023.01); *G06V 10/25* (2022.01); *G06V 40/16* (2022.01); *H04N 23/611* (2023.01);
(Continued)

(58) Field of Classification Search
None
See application file for complete search history.

(56) References Cited

U.S. PATENT DOCUMENTS

| | | |
|---|---|---|
| 2,106,752 A | 2/1938 | Land |
| 2,354,503 A | 7/1944 | Cox |

(Continued)

FOREIGN PATENT DOCUMENTS

| | | |
|---|---|---|
| CN | 101634738 A | 1/2010 |
| CN | 102147519 A | 8/2011 |

(Continued)

OTHER PUBLICATIONS

ISR in related PCT application PCT/IB2023/057878, dated Nov. 2, 2023.

(Continued)

*Primary Examiner* — Eileen M Adams
(74) *Attorney, Agent, or Firm* — Nathan & Associates; Menachem Nathan

(57) ABSTRACT

Mobile devices comprising a first camera having a first camera field-of-view ($FOV_1$) and including a first image sensor configured to operate a first segment of the first image sensor in a full resolution-mode for capturing full resolution image data and to operate a second segment of the first image sensor in a binning resolution mode for capturing binning resolution image data and a processor for analyzing image data of the first camera to select a region of interest (ROI) in a scene and for configuring the first image sensor so that the selected ROI is captured in full resolution. In (Continued)

some examples, a mobile device further comprises a second camera having a second FOV (FOV$_2$) and including a second image sensor configured to capture FOV$_2$, wherein the analysis of image data to select a ROI is performed by analysing image data of the second camera.

41 Claims, 9 Drawing Sheets

(51) Int. Cl.
*G06V 40/16* (2022.01)
*H04N 23/611* (2023.01)
*H04N 23/63* (2023.01)
*H04N 23/667* (2023.01)
*H04N 23/698* (2023.01)
*H04N 23/90* (2023.01)
*H04N 25/443* (2023.01)
*H04N 25/46* (2023.01)

(52) U.S. Cl.
CPC ......... *H04N 23/635* (2023.01); *H04N 23/667* (2023.01); *H04N 23/698* (2023.01); *H04N 23/90* (2023.01); *H04N 25/443* (2023.01); *H04N 25/46* (2023.01)

(56) References Cited

U.S. PATENT DOCUMENTS

| | | | |
|---|---|---|---|
| 2,378,170 A | 6/1945 | Aklin | |
| 2,441,093 A | 5/1948 | Aklin | |
| 3,388,956 A | 6/1968 | Eggert et al. | |
| 3,524,700 A | 8/1970 | Eggert et al. | |
| 3,558,218 A | 1/1971 | Grey | |
| 3,864,027 A | 2/1975 | Harada | |
| 3,942,876 A | 3/1976 | Betensky | |
| 4,134,645 A | 1/1979 | Sugiyama et al. | |
| 4,338,001 A | 7/1982 | Matsui | |
| 4,465,345 A | 8/1984 | Yazawa | |
| 4,792,822 A | 12/1988 | Akiyama et al. | |
| 5,000,551 A | 3/1991 | Shibayama | |
| 5,327,291 A | 7/1994 | Baker et al. | |
| 5,331,465 A | 7/1994 | Miyano | |
| 5,969,869 A | 10/1999 | Hirai et al. | |
| 6,014,266 A | 1/2000 | Obama et al. | |
| 6,035,136 A | 3/2000 | Hayashi et al. | |
| 6,147,702 A | 11/2000 | Smith | |
| 6,169,636 B1 | 1/2001 | Kreitzer | |
| 6,654,180 B2 | 11/2003 | Ori | |
| 7,187,504 B2 | 3/2007 | Horiuchi | |
| 7,206,136 B2 | 4/2007 | Labaziewicz et al. | |
| 7,515,351 B2 | 4/2009 | Chen et al. | |
| 7,564,635 B1 | 7/2009 | Tang | |
| 7,643,225 B1 | 1/2010 | Tsai | |
| 7,660,049 B2 | 2/2010 | Tang | |
| 7,684,128 B2 | 3/2010 | Tang | |
| 7,688,523 B2 | 3/2010 | Sano | |
| 7,692,877 B2 | 4/2010 | Tang et al. | |
| 7,697,220 B2 | 4/2010 | Iyama | |
| 7,738,186 B2 | 6/2010 | Chen et al. | |
| 7,777,972 B1 | 8/2010 | Chen et al. | |
| 7,813,057 B2 | 10/2010 | Lin | |
| 7,821,724 B2 | 10/2010 | Tang et al. | |
| 7,826,149 B2 | 11/2010 | Tang et al. | |
| 7,826,151 B2 | 11/2010 | Tsai | |
| 7,869,142 B2 | 1/2011 | Chen et al. | |
| 7,898,747 B2 | 3/2011 | Tang | |
| 7,916,401 B2 | 3/2011 | Chen et al. | |
| 7,918,398 B2 | 4/2011 | Li et al. | |
| 7,957,075 B2 | 6/2011 | Tang | |
| 7,957,076 B2 | 6/2011 | Tang | |
| 7,957,079 B2 | 6/2011 | Tang | |
| 7,961,406 B2 | 6/2011 | Tang et al. | |
| 8,000,031 B1 | 8/2011 | Tsai | |
| 8,004,777 B2 | 8/2011 | Sano et al. | |
| 8,077,400 B2 | 12/2011 | Tang | |
| 8,149,523 B2 | 4/2012 | Ozaki | |
| 8,218,253 B2 | 7/2012 | Tang | |
| 8,228,622 B2 | 7/2012 | Tang | |
| 8,233,224 B2 | 7/2012 | Chen | |
| 8,253,843 B2 | 8/2012 | Lin | |
| 8,279,537 B2 | 10/2012 | Sato | |
| 8,363,337 B2 | 1/2013 | Tang et al. | |
| 8,395,851 B2 | 3/2013 | Tang et al. | |
| 8,400,717 B2 | 3/2013 | Chen et al. | |
| 8,451,549 B2 | 5/2013 | Yamanaka et al. | |
| 8,503,107 B2 | 8/2013 | Chen et al. | |
| 8,514,502 B2 | 8/2013 | Chen | |
| 8,570,668 B2 | 10/2013 | Takakubo et al. | |
| 8,718,458 B2 | 5/2014 | Okuda | |
| 8,780,465 B2 | 7/2014 | Chae | |
| 8,810,923 B2 | 8/2014 | Shinohara | |
| 8,854,745 B1 | 10/2014 | Chen | |
| 8,958,164 B2 | 2/2015 | Kwon et al. | |
| 9,185,291 B1 | 11/2015 | Shabtay | |
| 9,229,194 B2 | 1/2016 | Yoneyama et al. | |
| 9,235,036 B2 | 1/2016 | Kato et al. | |
| 9,279,957 B2 | 3/2016 | Kanda et al. | |
| 9,438,792 B2 | 9/2016 | Nakada et al. | |
| 9,488,802 B2 | 11/2016 | Chen et al. | |
| 9,568,712 B2 | 2/2017 | Dror et al. | |
| 9,678,310 B2 | 6/2017 | Iwasaki et al. | |
| 9,817,213 B2 | 11/2017 | Mercado | |
| 2002/0118471 A1 | 8/2002 | Imoto | |
| 2003/0048542 A1 | 3/2003 | Enomoto | |
| 2005/0041300 A1 | 2/2005 | Oshima et al. | |
| 2005/0062346 A1 | 3/2005 | Sasaki | |
| 2005/0128604 A1 | 6/2005 | Kuba | |
| 2005/0141103 A1 | 6/2005 | Nishina | |
| 2005/0168840 A1 | 8/2005 | Kobayashi et al. | |
| 2005/0270667 A1 | 12/2005 | Gurevich et al. | |
| 2006/0092524 A1 | 5/2006 | Konno | |
| 2006/0238902 A1 | 10/2006 | Nakashima et al. | |
| 2006/0275025 A1 | 12/2006 | Labaziewicz et al. | |
| 2007/0114990 A1 | 5/2007 | Godkin | |
| 2007/0229983 A1 | 10/2007 | Saori | |
| 2007/0247726 A1 | 10/2007 | Sudoh | |
| 2007/0253689 A1 | 11/2007 | Nagai et al. | |
| 2008/0056698 A1 | 3/2008 | Lee et al. | |
| 2008/0094730 A1 | 4/2008 | Toma et al. | |
| 2008/0094738 A1 | 4/2008 | Lee | |
| 2008/0291531 A1 | 11/2008 | Heimer | |
| 2008/0304161 A1 | 12/2008 | Souma | |
| 2009/0002839 A1 | 1/2009 | Sato | |
| 2009/0067063 A1 | 3/2009 | Asami et al. | |
| 2009/0122423 A1 | 5/2009 | Park et al. | |
| 2009/0135245 A1 | 5/2009 | Luo et al. | |
| 2009/0141365 A1 | 6/2009 | Jannard et al. | |
| 2009/0147368 A1 | 6/2009 | Oh et al. | |
| 2009/0225438 A1 | 9/2009 | Kubota | |
| 2009/0279191 A1 | 11/2009 | Yu | |
| 2009/0303620 A1 | 12/2009 | Abe et al. | |
| 2010/0026878 A1 | 2/2010 | Seo | |
| 2010/0033844 A1 | 2/2010 | Katano | |
| 2010/0060995 A1 | 3/2010 | Yumiki et al. | |
| 2010/0165476 A1 | 7/2010 | Eguchi | |
| 2010/0214664 A1 | 8/2010 | Chia | |
| 2010/0277813 A1 | 11/2010 | Ito | |
| 2011/0001838 A1 | 1/2011 | Lee | |
| 2011/0032409 A1 | 2/2011 | Rossi et al. | |
| 2011/0080655 A1 | 4/2011 | Mori | |
| 2011/0102667 A1 | 5/2011 | Chua et al. | |
| 2011/0102911 A1 | 5/2011 | Iwasaki | |
| 2011/0115965 A1 | 5/2011 | Engelhardt et al. | |
| 2011/0149119 A1 | 6/2011 | Matsui | |
| 2011/0157430 A1 | 6/2011 | Hosoya et al. | |
| 2011/0188121 A1 | 8/2011 | Goring et al. | |
| 2011/0249347 A1 | 10/2011 | Kubota | |
| 2012/0062783 A1 | 3/2012 | Tang et al. | |
| 2012/0069455 A1 | 3/2012 | Lin et al. | |
| 2012/0092777 A1 | 4/2012 | Tochigi et al. | |
| 2012/0105708 A1 | 5/2012 | Hagiwara | |
| 2012/0147489 A1 | 6/2012 | Matsuoka | |

(56) References Cited

U.S. PATENT DOCUMENTS

| | | |
|---|---|---|
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0127980 A1 | 5/2013 | Haddick |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0288950 A1* | 10/2015 | Zhang .................. H04N 13/25 348/47 |
| 2015/0323757 A1 | 11/2015 | Bone |
| 2015/0324952 A1 | 11/2015 | Namboodiri |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2018/0024319 A1 | 1/2018 | Lai et al. |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0114308 A1* | 4/2018 | Herrmann .......... G01N 21/8903 |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0075284 A1 | 3/2019 | Ono |
| 2019/0086638 A1 | 3/2019 | Lee |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2019/0363118 A1* | 11/2019 | Berkovich .......... H04N 25/44 |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0284883 A1* | 9/2020 | Ferreira .............. H04N 25/773 |
| 2020/0333691 A1 | 10/2020 | Shabtay et al. |
| 2020/0371323 A1* | 11/2020 | Chern .............. G02B 27/0012 |
| 2020/0400926 A1 | 12/2020 | Bachar |
| 2021/0048628 A1 | 2/2021 | Shabtay et al. |
| 2021/0263276 A1 | 8/2021 | Huang et al. |
| 2021/0318444 A1 | 10/2021 | Li |
| 2021/0364746 A1 | 11/2021 | Chen |
| 2021/0396974 A1 | 12/2021 | Kuo |
| 2022/0046151 A1 | 2/2022 | Shabtay et al. |
| 2022/0057604 A1* | 2/2022 | Son .................. G02B 13/0045 |
| 2022/0066168 A1 | 3/2022 | Shi |
| 2022/0113511 A1 | 4/2022 | Chen |
| 2022/0232167 A1 | 7/2022 | Shabtay et al. |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 A | 12/1979 |
| JP | S59121015 A | 7/1984 |
| JP | 6165212 A | 4/1986 |
| JP | S6370211 A | 3/1988 |
| JP | H0233117 A | 2/1990 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 2000292848 A | 10/2000 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |

(56) References Cited

FOREIGN PATENT DOCUMENTS

| | | | |
|---|---|---|---|
| JP | 2010164841 | A | 7/2010 |
| JP | 2011145315 | A | 7/2011 |
| JP | 2012203234 | A | 10/2012 |
| JP | 2013003317 | A | 1/2013 |
| JP | 2013003754 | A | 1/2013 |
| JP | 2013101213 | A | 5/2013 |
| JP | 2013105049 | A | 5/2013 |
| JP | 2013106289 | A | 5/2013 |
| JP | 2013148823 | A | 8/2013 |
| JP | 2014142542 | A | 8/2014 |
| JP | 2017116679 | A | 6/2017 |
| JP | 2018059969 | A | 4/2018 |
| JP | 2019113878 | A | 7/2019 |
| KR | 20080088477 | A | 10/2008 |
| KR | 20090019525 | A | 2/2009 |
| KR | 20090131805 | A | 12/2009 |
| KR | 20110058094 | A | 6/2011 |
| KR | 20110115391 | A | 10/2011 |
| KR | 20120068177 | A | 6/2012 |
| KR | 20140135909 | A | 5/2013 |
| KR | 20140023552 | A | 2/2014 |
| KR | 20160000759 | A | 1/2016 |
| KR | 101632168 | B1 | 6/2016 |
| KR | 20160115359 | A | 10/2016 |
| TW | M602642 | U | 10/2020 |
| WO | 2013058111 | A1 | 4/2013 |
| WO | 2013063097 | A1 | 5/2013 |
| WO | 2018130898 | A1 | 7/2018 |
| WO | 2019134044 | A1 | 7/2019 |

OTHER PUBLICATIONS

WO in related PCT application PCT/IB2023/057878, dated Nov. 2, 2023.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Office Action in related CN patent Application No. 202380013453.5, dated Dec. 11, 2024.

\* cited by examiner

100
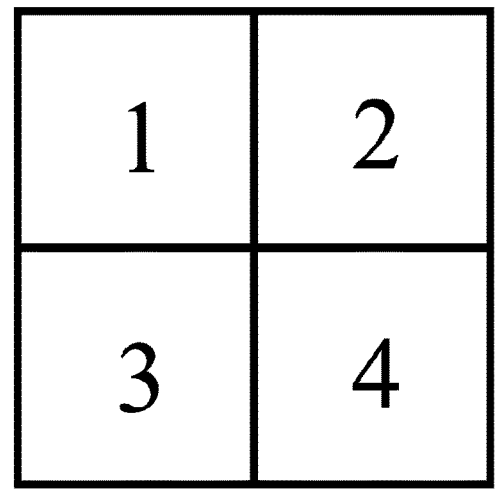
FIG. 1A  KNOWN ART
100
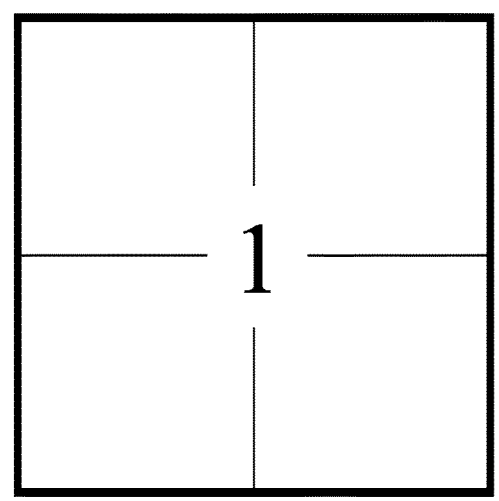
FIG. 1B  KNOWN ART

150
| 1 | 2 | 5 | 6 |
|---|---|---|---|
| 3 | 4 | 7 | 8 |
| 9 | 10 | 13 | 14 |
| 11 | 12 | 15 | 16 |
FIG. 1C            KNOWN ART
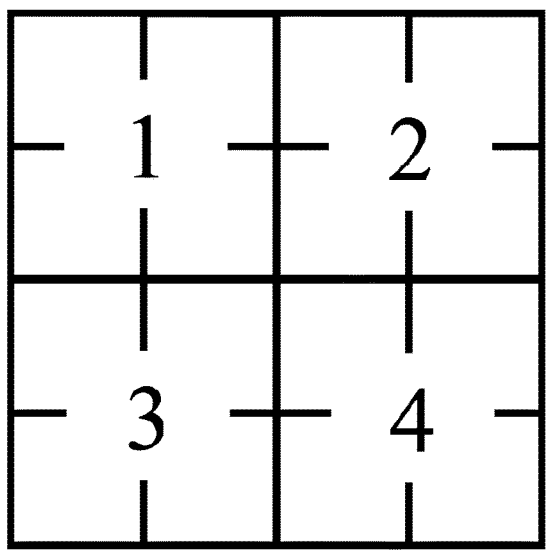
FIG. 1D     KNOWN ART
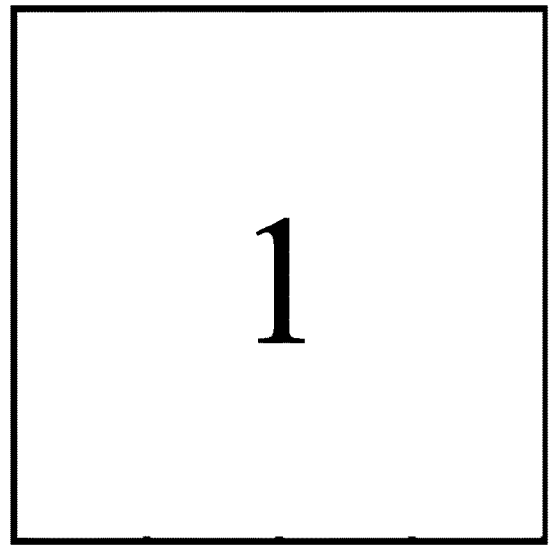
FIG. 1E     KNOWN ART

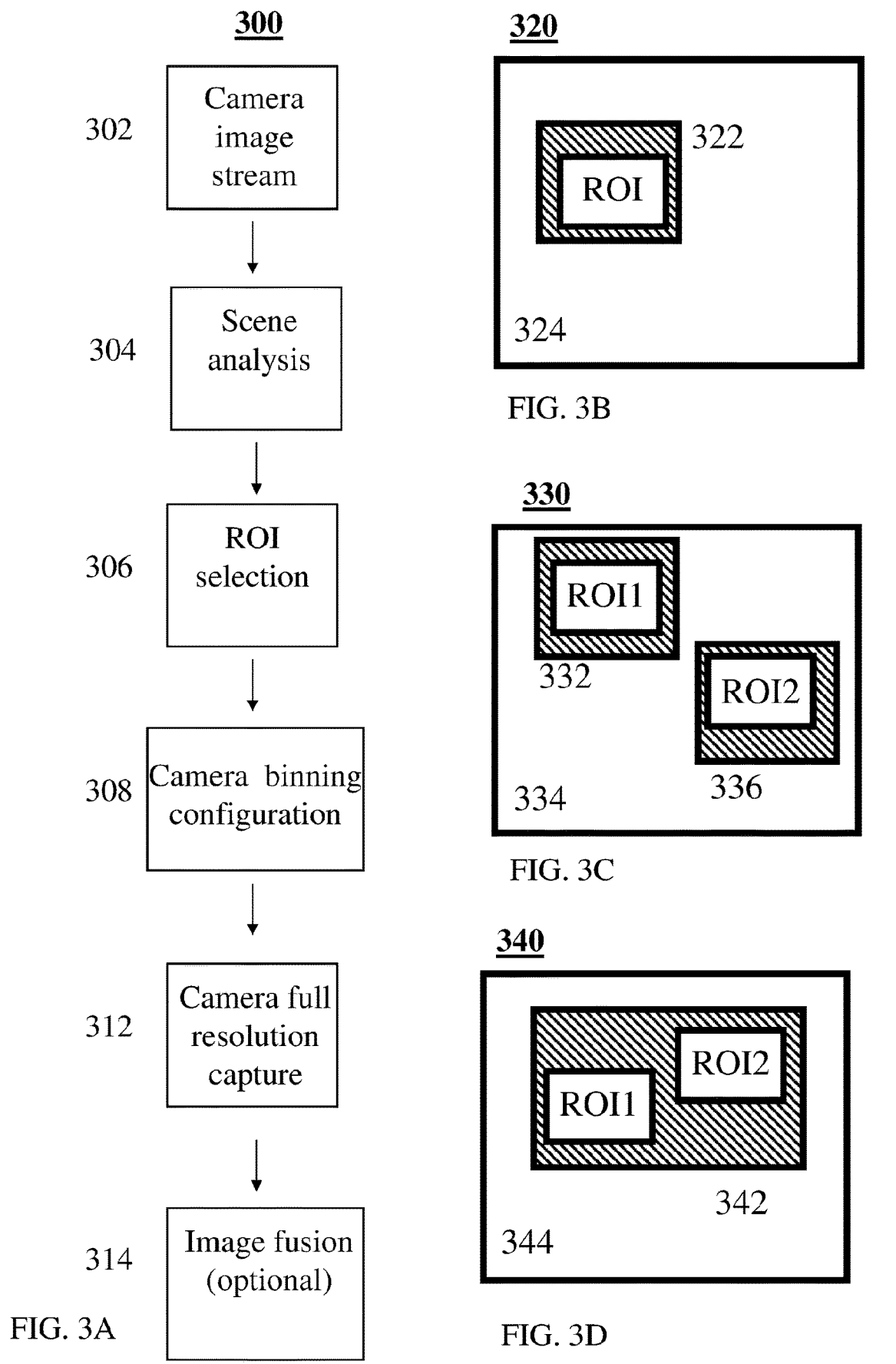

SYSTEMS AND METHODS FOR ZOOM DIGITAL CAMERA WITH AUTOMATIC ADJUSTABLE ZOOM FIELD OF VIEW

CROSS REFERENCE TO RELATED APPLICATIONS

This is a 371 application from international patent application PCT/IB2023/057878 filed Aug. 3, 2023, which is related to and claims priority from U.S. provisional patent application No. 63/395,362 filed Aug. 5, 2022, which is incorporated herein by reference in its entirety.

FIELD

Embodiments disclosed herein relate in general to digital cameras and in particular to slim zoom digital cameras included in mobile devices.

BACKGROUND

Multi-aperture cameras (or multi-cameras) are standard in modern mobile handheld electronic devices (or simply "mobile devices") such as smartphones, headsets for augmented reality (AR) or virtual reality (VR), tablets and laptops. A multi-camera usually comprises a wide field-of-view (FOV) or wide angle camera ("Wide" or "W" camera with a $FOV_W$), and one or more additional cameras, either with a narrower FOV than $FOV_W$ ("Telephoto" or "Tele" or "T" camera, with a $FOV_T$) or with a wider FOV than $FOV_W$ ("Ultra-Wide" or "UW" camera with a $FOV_{UW}$).

A multi-camera is beneficial for capturing a particular FOV segment of a scene with a maximum spatial resolution (or "pixel resolution"). For example, a first very wide FOV segment of a scene may be captured with the UW camera in a UW camera resolution. A second FOV segment (narrower than the first FOV segment) of a scene may be captured with the W camera in a W camera resolution. Assuming a same image sensor size in both the W and the UW camera (or a smaller image sensor size in the UW camera), a same FOV segment included in both the first FOV segment and the second FOV segment is captured by the W camera with higher spatial resolution. Thus, the W camera achieves a zoom effect when compared to the UW camera. Accordingly, the following approach (henceforth "multi-camera maximum resolution capturing") is used to capture a particular desired FOV segment with maximum spatial resolution: (1) one selects the particular camera out of the multi-cameras that has a narrowest FOV but that still is sufficiently wide to include the entire desired FOV segment; (2) one points the selected particular camera's FOV center towards the scene so that the desired FOV segment is included; or (3) one captures the desired FOV segment with the selected particular camera. In the following, we may use the terms "FOV segment" and "sensor segment" interchangeably. We note that hereby is referred to a particular FOV segment that is imaged by a lens of a camera onto a particular sensor segment. In general, the lens has a fixed (or "constant") EFL, so that the particular sensor segment is unambiguously defined the particular FOV segment and vice versa. In a zoom camera having a changeable EFL to provide several zoom states, the terms "FOV segment" and "sensor segment" may refer to one particular zoom state out of the several zoom states.

Recently, the spatial resolution of image sensors included in multi-cameras has increased significantly, reaching 200 megapixel (MP) in 2022. In general, image sensors that have a resolution of about 30 MP or more are configured to perform "pixel binning" as known in the art. Such image sensors are referred to herein as "binning sensors". Pixel binning is a technique where multiple adjacent or "neighbouring" (smaller) pixels on an image sensor are combined (or "binned"', "grouped", or "merged") to work together as one (larger) pixel.

FIG. 1A shows a pixel assembly 100 of an image sensor that includes four pixels numbered 1-4 in a first configuration. The four pixels capture scene information independently from each other. That is, when capturing an image, each of the four pixels 1-4 provides a different pixel value. We refer to this configuration as "higher pixel resolution mode" ("HRM"). As each single pixel is captured (or "read out"), we may refer to this configuration also as "full pixel resolution mode".

FIG. 1B shows pixel assembly 100 in a second configuration. The four pixels are combined (or "binned") into one pixel and do not capture scene information independently from each other. That is, when capturing an image, the four combined pixels together provide one pixel value. We refer to such a configuration as "binning mode" or "lowest pixel resolution mode". Specifically, we refer to the second configuration that combines 4 pixel into one pixel as "4-binning". In 4-binning, a binning sensor can be switched between two different pixel resolution modes, a lowest pixel resolution mode and one HRM. In other examples, nine pixels may be combined into one pixel ("9-binning").

FIG. 1C shows another pixel assembly 150 of an image sensor that includes 16 pixels numbered 1-16 in a first HRM. The 16 pixels capture scene information independently from each other. It is referred to the first HRM as "Higher HRM". The higher HRM corresponds to a "full pixel resolution mode".

FIG. 1D shows pixel assembly 150 in a second HRM. Pixels 1-4, pixels 5-8, pixels 9-12 and pixels 13-16 are combined into one pixel respectively. Combined pixels 1-4 do not capture scene information independently from each other, but pixels 1-4 together capture scene information independent from combined pixels 5-8, combined pixels 9-12 and combined pixels 13-16. It is referred to the second HRM as "Lower HRM".

FIG. 1E shows pixel assembly 150 in a lowest pixel resolution (or binning) mode. All 16 pixels are combined into one pixel and do not capture scene information independently from each other. Specifically, we refer to the lowest pixel resolution mode as "16-binning". In general a 16-binning sensor can be switched between three different pixel resolution modes, a lowest pixel resolution mode, a lower HRM and a higher HRM.

In general, a pixel assembly 100 or a pixel assembly 150 of a binning sensor is covered by a single color filter. That is, all pixels included in pixel assembly 100 and pixel assembly 150 respectively are operational to receive light of a specific color (i.e. light of a particular wavelength range). For example, pixel assembly 100 or pixel assembly 150 may be covered by a Red color filter ("R"), by a Green color filter ("G") or by a Blue color filter ("B"). In some examples, pixel assembly 100 or pixel assembly 150 may not be covered by a color filter, so that all pixel included in the pixel assembly are operational to receive light from all wavelengths that reach the image sensor. To the pixel in such a pixel assembly is referred to as "White" or "W" pixel or "Clear" or "C" pixel. In general, four pixel assemblies such as pixel assembly 100 or pixel assembly 150 form together a smallest pixel unit (or "building block") of a binning sensor, specifically of its color filter array ("CFA"). The four pixel assemblies have two or more different color filter respectively. A typical CFA is "RGB" or "Bayer CFA", "RGBC", "RCCB" etc. For an RGB image captured with a Bayer CFA, "remosaicing" as known in the art is performed to obtain an output image where each pixel has a pixel value for each of R, G and B. For example with reference to FIG. 1A, after remosaicing each of the 4 pixels has a pixel value for each of R, G and B. Overall, the 4 pixels have 12 different pixel values. With reference to FIG. 1B, after remosaicing the one pixels has a pixel value for each of R, G and B. Overall, the one pixel has 3 different pixel values.

When performing pixel binning, the pixel (or "spatial") resolution of a binning sensor is reduced. For example, in 4-binning (FIG. 1B), a pixel resolution in the lowest pixel resolution mode is ¼ of a pixel resolution obtained in the HRM (FIG. 1A). In 9-binning, a pixel resolution in the lowest pixel resolution mode is ⅑ of a pixel resolution obtained in the HRM. In 16-binning (FIG. 1E), a pixel resolution in the lowest pixel resolution mode is ¹⁄₁₆ of a pixel resolution obtained in the higher HRM (FIG. 1C) and ¼ of a pixel resolution obtained in the lower HRM (FIG. 1D). A binning sensor operational to perform 4-binning, 9-binning or 16-binning is referred to as 4-binning sensor, 9-binning sensor or 16-binning sensor respectively.

On the other hand, by switching from the lowest pixel resolution mode to a HRM, a zoom effect is achieved: A same camera FOV segment is captured (or "imaged") by a larger number of pixels. For example, a zoom effect of 2× is achieved when switching a 4-binning sensor from the lowest pixel resolution mode to the HRM. For example, an object may be captured with a camera located at an object-lens-distance ("u") away from the object. The object is captured in the following resolution: Res (mm)=Pixel size(um)×u(m)/EFL(mm). Thus, by switching from the lowest pixel resolution mode to the HRM, a 2× increase in resolution is obtained.

There is need and it would be beneficial to use a binning sensor in a mobile device for zooming into FOV segments by configuring the binning sensor. Systems and methods for zooming into FOV segments by configuring the binning sensor are disclosed herein.

SUMMARY

In various example embodiments, there is provided a mobile device, comprising a first camera having a first camera field-of-view ($FOV_1$) and including a first image sensor configured to operate a first segment of the first image sensor in a full resolution-mode for capturing full resolution image data and to operate a second segment of the first image sensor in a binning resolution mode for capturing binning resolution image data; and a processor for analyzing image data of the first camera to select a region of interest (ROI) in a scene and for configuring the first image sensor so that the selected ROI is captured in full resolution.

In some examples, any segment of the first image sensor can be operated in full resolution mode or in binning mode.

In some examples, the first image sensor is configured to operate the first segment of the first image sensor in a full resolution mode for capturing full resolution image data and to not operate the second segment of the first image sensor.

In some examples, the mobile device has a front surface including a screen and a rear surface, wherein the first camera is included in the rear surface.

In some examples, the mobile device is configured to perform single-camera maximum resolution capturing.

In some examples, the first camera captures $FOV_1$ in binning resolution to generate binning resolution image data of $FOV_1$, wherein the analysis of image data of the first camera is performed by analysing the binning resolution image data of $FOV_1$.

In some examples, the mobile device further comprises a second camera having a second FOV ($FOV_2$) and including a second image sensor configured to capture $FOV_2$, wherein the analysis of image data to select a ROI is performed by analysing image data of the second camera.

In some examples, the mobile device is operational to perform dual-camera maximum resolution capturing. In some such examples, the mobile device has a front surface including a screen and a rear surface, wherein the first camera and the second camera are included in the rear surface of the mobile device.

In some examples, the capturing of the full resolution image data and the binning resolution image data are performed autonomously.

In some examples, the binning resolution is lower by a factor of 4 than the full resolution.

In some examples, the binning resolution is lower by a factor of 9 than the full resolution.

In some examples, the binning resolution is lower by a factor of 16 than the full resolution.

In some examples, the processor is configured to pin the ROI captured in full resolution into a second image captured in binning resolution. In some examples, the ROI is selected according to aesthetic criteria. In some examples, the ROI is selected so that it includes a tracked human entirely. In some examples, the ROI is selected to include only a face of a tracked human.

In some examples, the mobile device is operational to perform autoframing.

In some examples, the mobile device is operational to generate a foveated video stream.

In some examples, the mobile device is operational to generate a smartshot. In some examples, the smartshot is a personalized smartshot. In some examples, the smartshot is a video smartshot.

In some examples, the mobile device is operational to generate a smart panorama.

In some examples, the mobile device is operational to generate a super-image.

In some examples, the mobile device is operational to generate a panning image.

In some examples, the mobile device is a smartphone. In some examples, the mobile device is a tablet.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale. In the drawings:

FIG. 1A shows a pixel assembly of a known image sensor in high resolution mode;

FIG. 1B shows the pixel assembly of FIG. 1A in lowest resolution mode;

FIG. 1C shows another pixel assembly of a known image sensor in a first high resolution mode;

FIG. 1D shows the pixel assembly of FIG. 1C in a second high resolution mode;

FIG. 1E shows the pixel assembly of FIG. 1C in a lowest resolution mode;

FIG. 3A shows steps of a single-camera method for maximum resolution capturing disclosed herein;

FIG. 3B shows a first example of a binning sensor configuration disclosed herein;

FIG. 3C shows a second example of a binning sensor configuration disclosed herein;

FIG. 3D shows a third example of a binning sensor configuration disclosed herein;

DETAILED DESCRIPTION

Figure 2:
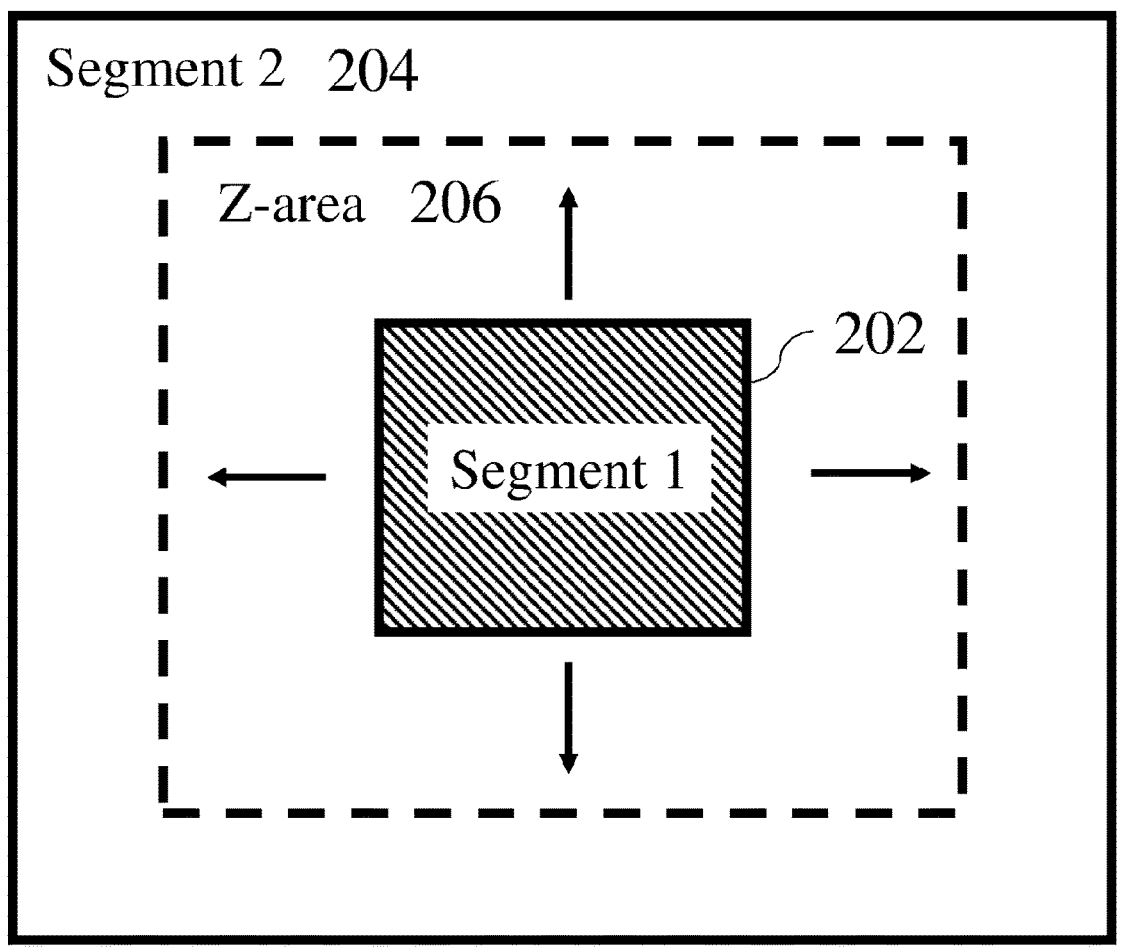
FIG. 2 shows a camera field-of-view as captured by an image sensor.

FIG. 2 illustrates an example of a FOV 200 of a single camera (not shown) captured by a binning sensor as disclosed herein. The binning sensor may be configured to perform pixel binning to switch between a lowest pixel resolution mode and one or more higher pixel resolution modes ("HRMs"). For each pixel assembly included in a binning sensor, a particular configuration defines whether a pixel assembly is operated in a lowest pixel resolution mode or in one of the HRMs. The single camera is configured so that FOV 200 coincides with an image sensor area of the binning sensor, so that the terms "FOV" and "sensor segment" can be used interchangeably. FOV 200 includes a first sensor segment ("segment 1") 202. The binning sensor is configured to switch to a binning configuration so that first sensor segment 202 operates in one of the one or more HRMs so that first sensor segment 202 is captured in a "higher" pixel resolution. Optionally, FOV 200 includes also a second sensor segment ("segment 2") 204. Second sensor segment 204 is operational in a lower pixel resolution than first sensor segment 202. This means that image data having two different pixel resolutions is generated. For this, the binning sensor switches to a binning configuration so that second sensor segment 204 operates in a lowest pixel resolution (binning) mode or in another one of the one or more HRMs, the another one of the one or more HRMs having a lower pixel resolution than the one of the one or more HRMs first sensor segment 202 is operated in. Output images of first sensor segment 202 and second sensor segment 204 respectively may be read out and transferred to a processor simultaneously or sequentially, i.e. as a single frame or as two sequential frames. For output images and a video stream of output images, this is referred to as "dual resolution images" and "dual resolution video stream" respectively. For example, referring to FIGS. 1A-B, second sensor segment 204 may operate in the lowest pixel resolution mode, whereas first sensor segment 202 may operate in the HRM. Referring to FIGS. 1C-E, in a first configuration, second sensor segment 204 may operate in the lowest pixel resolution mode first sensor segment 202 may operate in the higher HRM or it may operate in the lower HRM, whereas. In a second configuration, first sensor segment 202 may operate in the higher HRM, whereas second sensor segment 204 may operate in the lower HRM. In FIG. 2, second sensor segment 204 is shown so that it may cover entire FOV 200 or it may cover any image sensor area that is not included in first sensor segment 202.

Referring to a location (or "position") of first sensor segment 202 within FOV 200, we note that first sensor segment 202 is shown at a center position within FOV 200. In other examples, first sensor segment 202 may not be located at a center position, but at another location within FOV 200, as indicated by the arrows. Overall, first sensor segment 202 is "movable" (or "operational to scan") within a "zoom area" 206 of FOV 200. To clarify, first sensor segment 202 may be moveable so that it is entirely included within zoom area 206. In other words, first sensor segment 202 may not overlap with any sensor segment not included in zoom area 206. A center of zoom area 206 may be identical with a center of FOV 200, as shown. Zoom area 206 may be rectangular, or it may be circular. In FIG. 2, an areal size of zoom area 206 is smaller than an area of FOV 200 by about a factor 2. In other examples, zoom area 206 may be 1.5 times smaller than an area of FOV 200, or it may be 2 times, or 3 times or even 4 or 5 times smaller than an area of FOV 200. In yet other examples, zoom area 206 may cover entire FOV 200, so that first segment 202 can be located at any position within FOV 200. To clarify, the binning sensor is operational to switch any image sensor segment included in zoom area 206 between a lowest pixel resolution mode and one or more HRMs. The single camera may be configured to capture images (or video streams of images) in different pixel resolution modes sequentially or simultaneously. For example, the single camera may be configured to only capture an image or a video stream of images of second sensor segment 204 in the lowest pixel resolution, these being referred to as "lowest pixel resolution image" and "lowest pixel resolution video stream" respectively. The single camera may also be configured to only capture an image or a video stream of images of first sensor segment 202 in higher pixel resolution, referred to as "higher pixel resolution image" and "higher pixel resolution video stream" respectively. In some of these examples for capturing an image of first sensor segment 202 in higher pixel resolution, image signal processing ("ISP") may be performed so that an image quality is maximized for first sensor segment 202. In some of these examples for capturing a video stream of images of first sensor segment 202 in higher pixel resolution, ISP may be performed so that an image quality or an image setting is relatively similar (or uniform) between consecutive images in the video stream of images.

An image setting may e.g. be a brightness, a dynamic range etc. In some examples, not just one sensor segment such as first sensor segment 202 may be operated in a HRM to provide a higher pixel resolution image, but more than one (e.g. 2 or 3 or even more) different sensor segments may be simultaneously operated to provide higher pixel resolution images (see FIGS. 3C-D). In other words, not just one segment such as first sensor segment 202 may be included in zoom area 206, but a plurality of segments. The segments may be located anywhere within zoom area 206, and may or may not overlap with each other. In some of these examples, different segments out of the plurality of segments may be captured in different HRMs. This means that image data having three or more different pixel resolutions is generated. In some examples, ISP may be performed so that an image quality or an image setting is relatively similar between the image data having three or more different pixel resolutions. In some examples, a size of first sensor segment 202 may be constant (or fixed). In other examples, a size of first sensor segment 202 may be variable. For example, the size of first sensor segment 202 may be changed according to a size of a ROI (defined below), or the size may be changed according to a user command. For example, a user may request a particular FOV within FOV 200 to be captured in higher pixel resolution, or the user may request a particular pixel resolution, and a sensor segment may be selected accordingly. In some examples where a particular pixel count is requested alongside a variable size of first sensor segment 202, an image may be down-sampled according to a size of first sensor segment 202 so that the particular pixel count is obtained in an output image. It is noted that the down-sampling technique is beneficial for providing a user an appearance (or a feeling) of a continuous zoom-in action, although the switching between a lowest pixel resolution mode and one or more HRMs is discrete.

Definition of "Pixel Resolution"

When referring to a pixel resolution herein, it is referred to a density of pixel per FOV (or per sensor area). For example, two images are captured in a same pixel resolution, if a same FOV segment is imaged by a same number of pixels. Capturing a first image in a higher pixel resolution than a second image means that in the first image a particular FOV segment imaged by one particular pixel is smaller than in the second image. In fact, this means that a pixel resolution is independent of a size of a captured FOV.

Definition of "Pixel Count"

When referring to a pixel count herein, it is referred to a number (or "absolute number") of pixels included in a captured output image. For example, two output images have a same pixel count if both output images include a same number of pixels. A first output image having a higher pixel count than a second output image may be captured using a lower pixel resolution or using a higher pixel resolution compared to a second output image. For example and with reference to a 4-binning sensor (FIGS. 1A-B), a first output image having $FOV_1$ may be captured in the lowest pixel resolution mode, and a second output image having $FOV_2$ may be captured in the HRM. In case $FOV_1 > 4 \times FOV_2$, a pixel count in the first output image is higher than a pixel count in the second image, although the first output image is captured with a lower pixel resolution.

Definition of "Full Sensor Pixel Resolution"

When referring to a full sensor pixel resolution herein, it is referred to a pixel count of an output image including an entire camera FOV such as FOV 200. This means that an image sensor operated with a particular full sensor pixel resolution can provide an output image with a pixel count that is equal to or smaller than its particular full sensor pixel resolution. In other words, a particular full sensor pixel resolution does not change if an image sensor is cropped, i.e. not all pixels are operated.

For example, a 4-binning sensor operated in the HRM may have a full sensor pixel resolution of 50 MP. In this configuration, the 4-binning sensor is operational to provide output images having a pixel count of 50 MP when an entire camera FOV is captured. When the 4-binning sensor captures a FOV being e.g. only a quarter of size compared to an entire camera FOV, an output image having a pixel count of 12.5 MP is obtained. The same 4-binning sensor operated in the lowest pixel resolution mode has a full sensor pixel resolution of 12.5 MP. In this configuration, the 4-binning sensor is operational to provide output images having a pixel count of 12.5 MP when an entire camera FOV is captured. When the 4-binning sensor captures a FOV being only a quarter of size compared to an entire camera FOV, an output image having a pixel count of about 3.1 MP is obtained.

As discussed, a 4-binning sensor and a 16-binning sensor are operational to switch between two and three different pixel resolution modes respectively. In other examples, 36 pixels may be combined into one pixel ("36-binning"). In yet other examples, even more pixels may be combined into one pixel. A 36-binning sensor may be operational to switch between four different pixel resolution modes respectively. A zoom effect of 2×, 3×, 4× and 6× is achieved when switching from 4-binning, 9-binning, 16-binning and 36-binning to full resolution respectively.

Table 1 shows examples of different binning states and associated pixel resolutions. The examples may be exemplarily for mobile devices such as smartphones.

"Lowest Res mode" gives a resolution range of a lowest pixel resolution mode in MP. In general, a typical pixel resolution of a lowest pixel resolution mode is 12 MP or 12.5 MP.

"Res 1" gives a resolution range of a lower HRM (16-binning) or of a lowest HRM (36-binning) in MP.

"Res 2" gives a resolution range of a higher HRM (16-binning) or of an intermediate HRM (36-binning) in MP.

"Res 3" gives a resolution range of a highest HRM (36-binning) in MP.

"Notation 1" to "notation 3" refers to notation used for the respective HRM herein.

TABLE 1

| Binning type | #HRMS | Lowest Res mode | HRM |  |  |  |  |  |
|---|---|---|---|---|---|---|---|---|
| | | | Res 1 | Notation 1 | Res 2 | Notation 2 | Res 3 | Notation 3 |
| 4 | 1 | 11-13 | 45-55 | Higher | | | | |
| 9 | 1 | 11-13 | 95-120 | Higher | | | | |
| 16 | 2 | 11-13 | 45-55 | Lower | 180-220 | Higher | | |
| 36 | 3 | 11-13 | 45-55 | Lowest | 95-120 | Intermediate | 350-450 | Highest |

For example, a 16-binning sensor operated in the higher HRM may have a full sensor pixel resolution of 200 MP. In a first step, 4-binning may be performed, so that 16-binning sensor is operated in the lower HRM and a full sensor pixel resolution is reduced to 50 MP by the binning. A video stream may be recorded at 8 k resolution (or pixel count). In an additional second step, another 4-binning may be performed, so that 16-binning is performed and the 16-binning sensor is operated in the lowest pixel resolution mode with the full sensor pixel resolution is reduced to 12.5 MP by the binning. A video stream may be recorded at 4 k resolution.

For example, a 36-binning sensor operated in the highest HRM may have a full sensor pixel resolution of 440 MP. The highest HRM corresponds to a full pixel resolution mode. In a first step, 4-binning may be performed, so that 36-binning sensor is operated in the intermediate HRM and a full sensor pixel resolution is reduced to 110 MP by the binning. A video stream may be recorded at 8 k resolution. In a second step, 9-binning may be performed, so that 36-binning sensor is operated in the lowest pixel resolution mode and a full sensor pixel resolution is further reduced to 12.2 MP by the binning. A video stream may be recorded at 4 k resolution. In another (or "alternative") first step, 9-binning may be performed, so that 36-binning sensor is operated in the lowest HRM a full sensor pixel resolution is reduced to 48.9 MP by the binning. A video stream may be recorded at 8 k resolution. In another second step, 4-binning may be performed, so that 36-binning sensor is operated in the lowest pixel resolution mode and a full sensor pixel resolution is further reduced to 12.2 MP by the binning. A video stream may be recorded at 4 k resolution.

For the sake of simplicity, in the following for the most cases we refer to a "binary" option for pixel resolution only, i.e. we differentiate only between a "lower pixel resolution" and a "higher pixel resolution". This means that with reference to above example, to a full sensor pixel resolution of 200 MP may be referred to as "higher pixel resolution", to a full sensor pixel resolution of 12.5 MP may be referred to as "lower pixel resolution". An intermediate full sensor pixel resolution of 50 MP is referred to as "higher pixel resolution" in a first example when a transition to (or from) a lower full sensor pixel resolution (12.5 MP) is discussed, and it may be referred to as "lower pixel resolution" in a second example when a transition to (or from) a higher full sensor pixel resolution (200 MP) is discussed. A full sensor pixel resolution of 200 MP is referred to as "higher pixel resolution" or as "highest pixel resolution". A full sensor pixel resolution of 50 MP is referred to as "lower pixel resolution" or as "intermediate resolution" or as "higher pixel resolution". A full sensor pixel resolution of 12.5 MP is referred to as "lower pixel resolution" or as "lowest pixel resolution".

As an example for a binning sensor configurable to switch between four different binning modes, a 36-binning sensor may have a full sensor pixel resolution of e.g. 440 MP in the highest HRM. The sensor may be configured to perform 4-binning so that a full sensor pixel resolution of 110 MP is achieved. The sensor may in addition be configured to perform 9-binning so that a full sensor pixel resolution of 48.9 MP is achieved. The sensor may in addition be configured to perform 36-binning so that a full sensor pixel resolution of 12.2 MP is achieved.

It is noted that herein, when discussing an area of an image sensor, it is referred only to an optically active area (or simply "active area") of the image sensor. In other words, areas of the image sensor that do not contribute to harvest photons are not considered. These image sensor areas may be required for providing an electrical connection to the image sensor, to allow mechanical integration of the image sensor into a camera etc. Specifically, FOV 200 represents an entire image sensor area of the binning sensor.

Changing the location of first sensor segment 202 within zoom area 206, or in other words, "moving" or "scanning" first sensor segment 202 within zoom area 206, is beneficial in many scenarios. This for example when there is a "data communication bandwidth constraint", referring to a particular pixel count that can be supported (or "output") per unit time. This creates a trade-off between a maximum pixel resolution and a maximum video frame rate. This is a common constraint in mobile devices such as smartphones, which have a finite data communication bandwidth between an image sensor and a processor, or a "de-facto" upper limit in terms of power consumption. Therefore, a user must often decide whether to capture a scene in a high pixel resolution or in a high frame rate, not both at once. However, in many scenes the user may not necessarily desire or need to capture the entire FOV, but only a particular FOV segment (smaller than the entire FOV). In such scenes and if a first sensor segment 202 can be moved (or scanned) according to a location or even according to a movement of a ROI (defined below), the user is still able to at least capture the particular FOV segment with both higher pixel resolution and high frame rate. Such a particular FOV segment may include a particular object that is of especially high interest to the user. The particular FOV segment is then referred to as "ROI". To capture a ROI with both higher pixel resolution and high frame rate, first sensor segment 202 may be scanned so that it includes the ROI, while second sensor segment 204 may be captured in a lower pixel resolution or it may not be captured at all. Compared to a scenario in which entire FOV 200 is captured in higher pixel resolution, here output images with a lower pixel count are obtained. The lower pixel count per output image may allow to capture the ROI in higher pixel resolution and high frame rate despite the data communication bandwidth constraint. In some examples, several ROIs may be captured in high resolution and high frame rate simultaneously.

Moving or scanning first sensor segment 202 can be beneficial also in computer vision tasks, such as for detecting and/or monitoring (or "tracking") objects or FOV segments continuously. This for example, where particular objects or scenarios require the analysis of video streams with higher pixel resolution images and a particular minimum frame rate, but where a processor is data communication bandwidth constraint. In example scenarios where it suffices to analyze only one or more ROIs within an entire camera FOV, and, in addition, where a first sensor segment 202 can be moved so that it includes these ROIs, one can still perform the computer vision task. This by capturing the one or more ROIs with higher pixel resolution and with the particular minimum frame rate or higher, while capturing all other sensor segments (or the entire FOV) in lower pixel resolution or not capturing it at all. Such scenarios can be found in mobile applications, automotive applications, security applications, industrial applications etc.

In some examples, higher pixel resolution images and lower pixel resolution images may be captured at a different frame rate. For example, the higher pixel resolution images may be captured faster (i.e. at a higher frame rate) than the lower pixel resolution images, or vice versa.

In some examples, an output image or a video stream of output images of first sensor segment 202 is output (e.g. to a user or for to a processor for ISP) at a variable (or changing) pixel count. For example, a pixel count may scale (or change) according to an areal size (or "area")" of first sensor segment 202. In some examples, the scaling between an area of first sensor segment 202 and the pixel count may be linear, i.e. when first sensor segment 202 increases by a particular percentage, also the pixel count may increase by that same percentage. In other examples, an output image or a video stream of images of first sensor segment 202 may be output at one or more fixed (or constant) particular pixel counts. For example, an output image may be up-sampled or down-sampled according to a size of first sensor segment 202, so that a particular pixel count is achieved. For example, a particular pixel count for stills photography may be about 12 MP, i.e. it may be in the range of 11 MP-13 MP, or it may be around 50 MP, i.e. it may be in the range of 48 MP-52 MP. A particular pixel count for video photography may be around 33 MP for "8 k video", i.e. it may be in the range of 32 MP-34 MP, or it may be around 8 MP for "4 k video", i.e. it may be in the range of 7 MP-9 MP, or it may be around 2 MP for "2 k video", i.e. it may be in the range of 1.5 MP-2.5 MP. In video photography, each frame (or single output image) of a video stream has the said particular pixel count. A frame rate of the video stream may be in the range of 5 frames per second ("fps") and 500 fps. Typically, a video frame rate may be in the range of 15 fps to 120 fps, especially 30 fps and 60 fps.

It is noted that compared to the lowest pixel resolution (binning) mode, in a HRM an areal size (or "area") of a single pixel is reduced. The area reduction of a single smaller pixel in HRM compared to a bigger combined pixel in the lowest pixel resolution mode is according to a number of pixel combined in the respective lowest pixel resolution mode. In 4-binning, the area reduction is ×4, in 9-binning it is 9×, in 16-binning it is up to 16× and in 36-binning it is up to 36×. The area reduction causes a reduction in terms of an amount of light that enters (or "is harvested by") a single smaller pixel, e.g. given by a number of photons that enter the single smaller pixel per unit time. The light reduction of a single smaller pixel scales according to the pixel area of the single smaller pixel. Therefore, in some scenarios scene properties such as brightness may be considered when configuring a binning sensor.

FIG. 3A shows steps of an embodiment of a method for maximum resolution capturing disclosed herein and numbered 300. Method 300 may be performed in a mobile device such as mobile device 400 (FIG. 4) or 500 (FIG. 5A) that includes at least one camera having a binning sensor and a processor such as an application processor ("AP") 430. This is referred to as "single-camera maximum resolution capturing".

In step 302, a user points the mobile device towards a scene, i.e. the user "targets" a scene. The camera captures image data, e.g. a continuous stream of images (or "video stream") or a single image. In general, in step 302 the binning sensor captures second sensor segment 204 in a lower pixel resolution mode such as e.g. the lowest pixel resolution mode, so that we refer to the captured image data as "lower resolution image data". In some examples, the mobile device may capture additional information such as audio data, position data, acceleration data or device orientation data of an inertial measurement unit (IMU), etc. In other examples, the mobile device may capture additional information that can be used to infer a desire (or intention) of a user, for example a particular location that the user touched on a touchscreen, a voice command transmitted by the user, a face expression of the user, an eye gaze of the user, etc.

In step 304, the processor is configured to analyze the lower resolution image data of the scene to provide (or "obtain") scene information. Examples for such scene analysis include detection of objects, calculation of a saliency map, detection of faces, detection of object motion, etc. In some examples, the processor may use the additional information captured in step 302 for analyzing the scene. For example, audio data or directional audio data may be used to detect objects.

In step 306, the processor is configured to prioritize the scene information of step 304 and to select one or more ROIs. For prioritization, methods known in the art such as "saliency detection", "face recognition" or "aesthetic framing" may be used. In some examples, the additional information may be used for prioritization. In other examples, a user may select one or more ROIs, e.g. by providing an audio command or a touch command on a touchscreen (see FIG. 3F). In yet other examples, image data available on the mobile device such as an image gallery of a particular user may be used for prioritizing, so that a taste (or "preference") of a particular user is satisfied ("personalized prioritization"). Examples for personalized prioritization may include prioritizing often captured persons, often captured objects, or often captured object classes. In yet other examples, image data used for prioritization such as popular or especially aesthetic image compositions may be retrieved from the Internet. In yet other examples, audio data may be used for prioritization. For example, when detecting a particular audio signal such as a voice of a particular person, or of a particular type of animal, or a sound of a particular musical instrument, a ROI may be selected that includes image data of the particular person, type of animal or musical instrument. In some examples, audio data may be used to guide (or "direct") image processing methods. For example, when detecting a particular audio signal such as a voice of a particular person, or a sound of a particular musical instrument, an image processing method may be configured to prioritize a detection of this particular person or this particular musical instrument. In step 308, the processor is configured to configure the camera and in particular the binning sensor so that the one or more ROIs selected in step 306 are included in FOV segments such as first sensor segment 202 and captured in the higher pixel resolution. That is, the one or more selected ROIs are included in one or more sensor segments that are captured in higher pixel resolution (see FIGS. 3B-D), and, if needed, in some particular frame rate. To achieve this, first sensor segment 202 may be moved within zoom area 206.

In some examples, the binning sensor is configured to operate only one sensor segment such as a first sensor segment 322 (FIG. 3B). In some of these examples and when a plurality of ROIs is selected, a first sensor segment may be moved so that it includes the entire plurality of ROIs. In addition, the first sensor segment may be scaled so that it includes the entire plurality of ROIs, such as first sensor segment 342 (FIG. 3D).

In step 312, the mobile device is configured to use the camera to capture ROIs in higher pixel resolution, referred to as "higher resolution image data". In some examples, only a first segment (including one or more ROIs) is captured and read out, e.g. for displaying higher pixel resolution image data to a user. In other examples, dual resolution images are captured. In yet other examples and when a plurality of ROIs are selected, step 308 and step 312 may be repeated sequentially, so that the ROIs are captured in higher pixel resolution sequentially, i.e. the ROIs are captured in higher pixel resolution in sequential frames. In yet other examples referred to as "single-camera tracking dual stream", two video streams are simultaneously captured and read out. A first video stream includes lower resolution image data. A second video stream includes higher resolution image data. In some of the yet other examples, the second video stream may include a particular object that is tracked by first segment 202, i.e. the first segment moves within zoom area 206 so that irrespective of the particular object's movement, the particular object remains within first segment 202. First segment 202 may be moved so that a ROI is located at a center of first segment 202, or first segment 202 may be moved so that a ROI is located within first segment 202 according to aesthetic criteria. In examples where a plurality of ROIs is tracked, first segment 202 may be scanned so that the plurality of ROIs is included in first segment 202, or first segment 202 may be scanned so that a maximum number of ROIs out of the plurality of ROIs is included in first segment 202.

In an optional step 314, the processor is configured to fuse (or "combine" or "stitch") image data generated in step 312, e.g. to fuse a plurality of images into one image. In a first example, the processor may be configured to fuse lower resolution image data with higher resolution image data. For example, the processor may fuse lower resolution image data generated in step 302 with higher resolution image data generated in step 312. An advantage of a resulting fused image is that it may show both an entire FOV (in lower pixel resolution) and a ROI (in higher pixel resolution), while still being relatively small in file size, so that it occupies only a relatively low amount of storage in a memory such as memory 450. "Relative" refers here to an amount of storage required for an image including the entire FOV in higher pixel resolution. In a second example, the processor may be configured to fuse lower resolution image data and higher resolution image data generated in step 312 as captured in dual resolution images. In a third example, the processor may be configured to fuse lower resolution image data and higher resolution image data generated by repeating all steps between step 306 and step 312 sequentially, i.e. in sequential frames. In some of the examples where the processor fuses lower resolution image data with higher resolution image data, ISP may be performed so that an image quality or an image setting is relatively similar between lower resolution image data and the higher resolution image data.

In some examples and for sequentially capturing a plurality of ROIs, after capturing a first ROI ("ROI$_1$") in higher pixel resolution in step 312, one may return to step 308 to configure the binning sensor so that a second ROI ("ROI$_2$") is captured in higher pixel resolution.

FIGS. 3B-D exemplarily show examples of binning sensor configurations as defined in step 308.

FIG. 3B shows a first example of a binning sensor configuration, numbered 320 showing a zoom area such as zoom area 206. In binning sensor configuration 320, a single ROI is prioritized. Second sensor segment 324 is captured in lower pixel resolution or not captured at all. First sensor segment 322 is moved so that it includes the ROI and is captured in higher pixel resolution. As shown, ROI is not located at a center of first sensor segment 322, but at a right-bottom area of first sensor segment 322.

FIG. 3C shows a second example of a binning sensor configuration, numbered 330. A first ROI ("ROI$_1$") and a second ROI ("ROI$_2$") are prioritized. There are two sensor segments captured in higher pixel resolution, first sensor segment 332 and third sensor segment 336. First sensor segment 334 is moved so that it includes ROI$_1$, third sensor segment 336 is moved so that it includes ROI$_2$. As shown, ROI$_1$ is located at a center of first sensor segment 332, and ROI$_2$ is located at a left-top area of third sensor segment 336. In some examples, first sensor segment 332 may be captured in a first pixel resolution and third sensor segment 336 may be captured in a second pixel resolution, wherein the first pixel resolution is different from the second pixel resolution. Referring to above example of a binning sensor operational to perform 16-binning and having a pixel resolution of 200 MP, this may for example be achieved according to the following: Second sensor segment 332 may be operated in the lowest pixel resolution mode, first sensor segment 332 may be operated in the lower HRM, and third sensor segment 336 may be operated in the higher HRM.

FIG. 3D shows a third example of a binning sensor configuration, numbered 340. A first ROI ("ROI$_1$") and a second ROI ("ROI$_2$") are prioritized. First sensor segment 342 is moved and scaled so that it includes both ROI$_1$ and ROI$_2$. First sensor segment 342 is captured in higher pixel resolution.

Figure 3E:
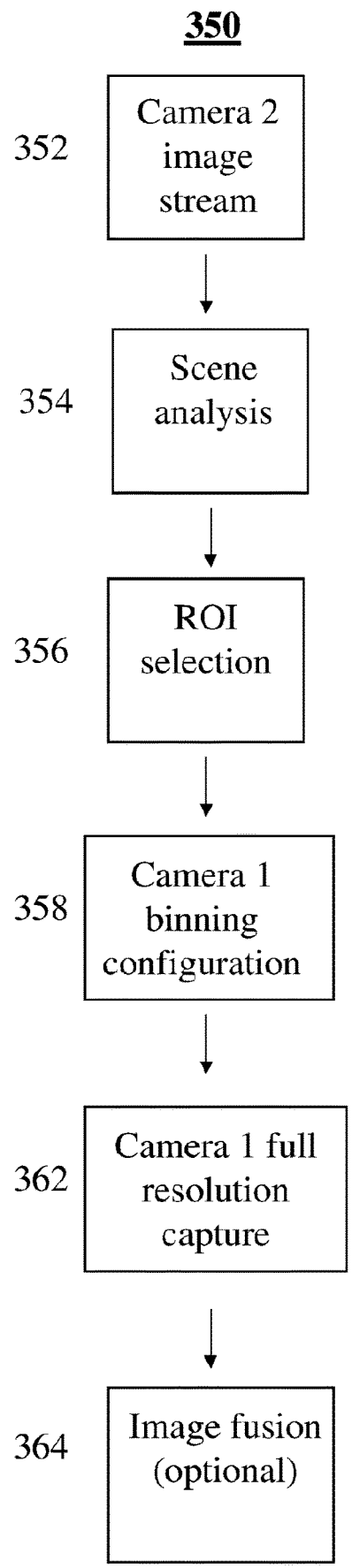
FIG. 3E shows steps of a dual-camera method for maximum resolution capturing disclosed herein.

FIG. 3E shows steps of a second method for maximum resolution capturing disclosed herein and numbered 350. Method 350 may be performed in a mobile device such as mobile device 400 or mobile device 550 that includes a processor (e.g. an AP), at least one first camera ("camera 1") that has a binning sensor and at least one second camera ("camera 2") that may or may not have a binning sensor. For performing method 350, camera 1 and camera 2 must be calibrated, so that a location in camera 1's FOV can be unambiguously assigned to a location in camera 2's FOV and vice versa. Method 350 is referred to as "dual-camera maximum resolution capturing". In general, a FOV of camera 1 (FOV1) is larger or equal to a FOV of camera 2 (FOV2), i.e. FOV1≥FOV2. In some examples, camera 1 may be a Wide (or "Main") camera and camera 2 may be an Ultra-Wide camera. In other examples, camera 1 may be a Tele camera and camera 2 may be a Wide camera.

In a step 352, a user points the mobile device towards a scene. Camera 2 captures second image data. In case camera 2 includes a binning sensor, in general in step 352 the sensor of camera 2 is used in lower pixel resolution mode. In some examples, the mobile device may capture additional information as detailed for step 302. In some examples, in addition camera 1 captures first image data.

In a step 354, the processor included in the mobile device is configured to use the second image data and, if available, the additional information to analyze the scene to provide/obtain scene information. In some examples and optionally, the processor is in addition configured to use first image data to analyze the scene.

In a step 356, the processor is configured to prioritize the scene information and to select one or more ROIs. For prioritization, methods as described above may be used. In some examples, the additional information may be used for prioritization. In other examples, a user may select one or more ROIs.

In a step 358, the processor is configured to configure the binning sensor included in camera 1 so that one or more ROIs selected in step 356 are included in sensor segments that are captured in higher pixel resolution, as detailed in FIGS. 3A-D.

In a step 362, the mobile device is configured to use camera 1 to capture the one or more ROIs in higher pixel resolution. In some examples, only first segment 202 (including the one or more ROIs) is captured and read out, e.g. for displaying it to a user. In other examples and for a camera 1 including a sensor configured to capture dual resolution images, first segment 202 and, in addition, second segment 204 may simultaneously be captured and read out. In yet other examples referred to as "dual-camera tracking dual stream", two video streams are simultaneously captured and read out. A first video stream includes lower resolution image data captured by camera 2, e.g. of the entire FOV2 or of parts thereof. A second video stream includes higher resolution image data captured by camera 1. In some of the yet other examples, the second video stream may include a particular object tracked by first segment 202.

In an optional step 364, the processor is configured to fuse image data generated in the previous steps. In a first example, the processor may be configured to fuse second (lower resolution) image data e.g. generated in step 352 with first (higher resolution) image data generated in step 362. In a second example, the processor may be configured to fuse lower resolution image data and higher resolution image data generated in step 362 as captured in dual resolution images. In a third example, the processor may be configured to fuse lower resolution image data and higher resolution image data generated by sequentially repeating all steps between step 356 and step 362.

Figure 3F:
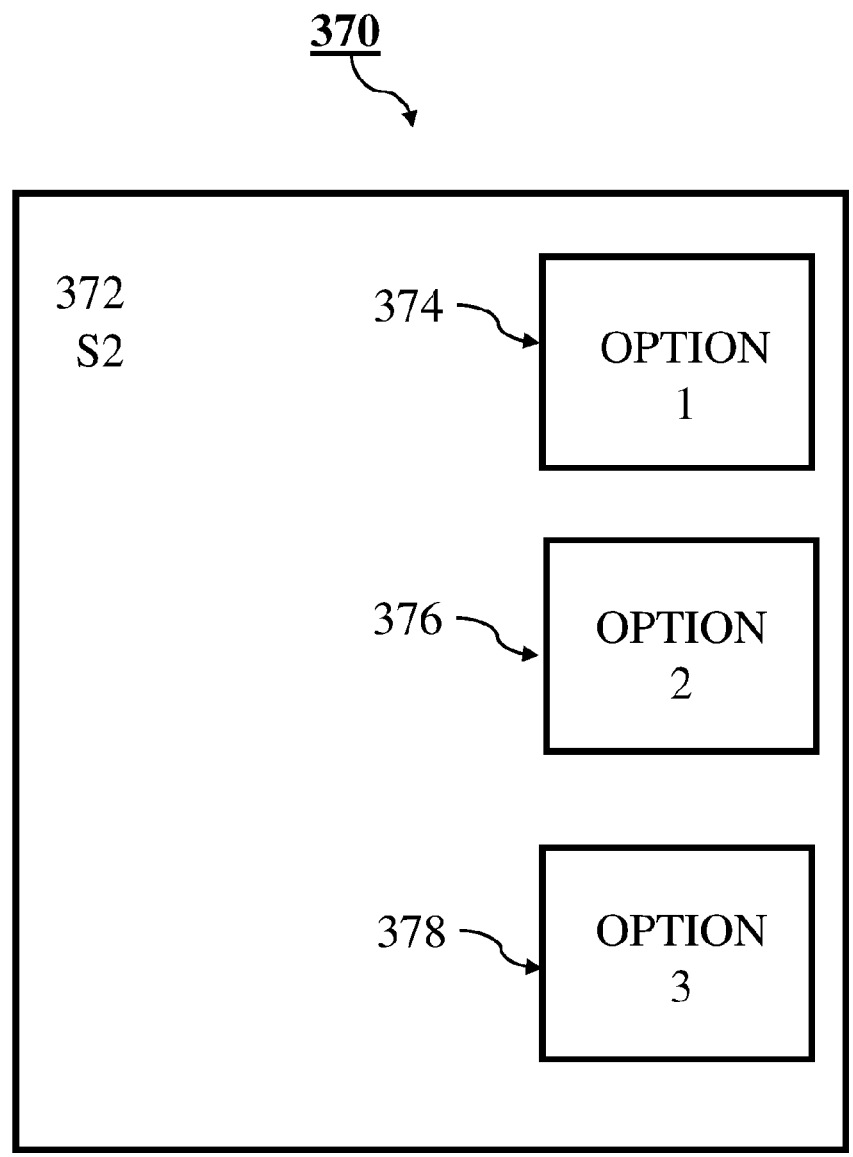
FIG. 3F shows a screen disclosed herein which is operational to conveniently present a user with information required to select one or more ROIs.

FIG. 3F shows a screen 370 disclosed herein which is operational to conveniently present a user with information required to select one or more ROIs. Screen 370 displays second segment 372 alongside several options for image sensor segments that include ROIs. From the several options for image sensor segments, a user may select one image sensor segment option which is then captured in higher pixel resolution. Specifically, screen 370 displays a first sensor segment option 374 including one or more ROIs, a second sensor segment option 376 including one or more ROIs and a third sensor segment option 578 including one or more ROIs. In an example, a user may select one of the sensor segment options 374 or 376 or 378 by touching screen 370.

In an example referred to as "autoframing", method 300 or method 350 may be performed by moving first segment 202 so that first segment 202 represents an aesthetic image composition. Referring to a second (higher resolution) video stream of a single-camera tracking dual stream or a dual-camera tracking dual stream, first segment 202 may scan second segment 204 so that an aesthetic image composition of the second image data is achieved. In some examples, "aesthetic image composition" may mean that a particular ROI is located at a particular position in first segment 202. In some examples, a particular ROI may be located at a center position of first segment 202 (see ROI1 in FIG. 3C). In other examples, a particular ROI may be located within first segment 202 according to the "rule of thirds" as known in the art. Aesthetic image composition may mean that not only a particular ROI is included in an image, but e.g. also a particular amount of background. For example, when capturing or tracking a human, one may select between different modes that include different FOV segments. A first mode may include a first FOV segment showing the entire human, a second mode may include a second FOV segment (smaller than the first FOV segment) showing only the torso of the human (e.g. not showing the legs of the human), a third mode may include a third FOV segment (smaller than the second FOV segment) showing only the head of the human (e.g. not showing the chest of the human), a fourth mode may include a fourth FOV segment (smaller than the third FOV segment) showing only the face of the human (e.g. not showing the hair of the human) etc. In some examples, the particular amount of background depends on properties of the background such as brightness, color composition etc., or properties of the background relative to properties of the particular ROI such as a difference in brightness, color composition etc. between the background and the particular ROI. Further criteria for an aesthetic image composition are e.g. described by Wang et al in the article "A deep network solution for attention and aesthetics aware photo cropping", 2018. In other examples, the particular amount of background depends on a preference of a user.

In another example referred to as "foveated video stream", in a first step, method 300 or method 350 may be performed repetitively (or sequentially) to capture a FOV segment $FOV_{FV}$ in higher pixel resolution which is larger than first segment 202, i.e. $FOV_{FV}>$first segment 202. This is achieved by sequentially repeating step 312 or step 362 for capturing a plurality of higher pixel resolution images, each higher pixel resolution image of the plurality of higher pixel resolution images covering a different $FOV \leq FOV_{FV}$, so that the plurality of higher pixel resolution images covers entire $FOV_{FV}$. In a second step, a part of or the entire plurality of higher pixel resolution images is stitched or fused into second segment 204, so that a fusion image including segments in lower pixel resolution and segments in higher pixel resolution is created. In other examples, in a second step a part or the entire plurality of higher pixel resolution images is stitched so that one higher pixel resolution image having $FOV_{FV}$ is obtained. A plurality of sequentially created fusion images form a single video stream which is displayed to a user. In some examples, images from the beginning of the single video stream (e.g. within the first ½ second or within the first 2 seconds) may include less FOV segments captured in higher pixel resolution than images from later parts of the single video stream.

In some foveated video stream examples, a particular order of capturing the higher pixel resolution images may be applied. In an example referred to as "foveated center video stream", a particular order may be to first capture FOV segments in higher pixel resolution that are located at a center of the camera FOV and successively capture FOV segments in higher pixel resolution that are closer to a margin of the camera FOV. In an example referred to as "foveated motion video stream", a particular order may be to first capture all FOV segments in higher pixel resolution where motion is detected (i.e. objects moving relative to a non-moving background) and afterwards capture FOV segments in higher pixel resolution where less or no motion is detected, or the other way around. In an example referred to as "foveated personalized video stream", a particular order may be defined by personalized prioritization. I.e. one may first capture all FOV segments in higher pixel resolution where particular objects that have a high value to a particular user are located, and afterwards capture FOV segments in higher pixel resolution where no particular objects that have a high value to a particular user are located.

In one example referred to as "smart panorama", all steps between step 302 and step 312 of method 300, or all steps between step 352 and step 362 method 350, may be performed sequentially while a user captures a panorama image as known in the art ("known panorama image" in the following). As done for capturing a known panorama image, for capturing a smart panorama image, a user moves a mobile device relative to a scene to sequentially capture a panorama FOV ($FOV_P$) of a scene which is larger than the camera FOV, i.e. $FOV_P>$FOV 200.

In the sequential performance of step 302 or step 352, a plurality of single lower pixel resolution images is captured, the plurality of single lower pixel resolution images including different $FOV_S$ of the scene. As a first step and for fusing a known panorama image, the plurality of single lower pixel resolution images may be fused.

In the sequential performance of step 312 or step 362, a plurality of higher pixel resolution images including ROIs may be captured. The plurality of higher pixel resolution images may include different ROIs that may be distributed all over $FOV_P$. In a second step, the plurality of higher pixel resolution images may be fused into the known panorama image, wherein the higher resolution image data is pinned to a particular location within the known panorama image. "Pinned" means here that higher resolution image data is fused into lower resolution image data so that a position of an object is "matched", i.e. an image point of a particular object point in the higher pixel resolution image is fused into the known panorama image so that its position does not deviate by more than a particular amount of pixels with respect to an image point of the particular object point in the known panorama image. The particular amount of pixel may be 1 pixel, 5 pixels, 10 pixels or more than 20 pixels, wherein a pixel size of about 1 µm is assumed.

The steps of method 300 or method 350 may be performed automatically (or "autonomously"), i.e., compared to a capture scenario of a regular panorama image, the user is not required to perform any additional action for capturing a smart panorama, but all additional steps are performed by the mobile device without user intervention. An advantage of a smart panorama image is that it shows ROIs present in the panoramic scene in higher pixel resolution, while still being relatively small in file size, so that it occupies only a relatively low amount of storage in a memory such as memory 450. In addition, it can be captured in a relatively short time frame. "Relatively low" and "relatively short" refer here to known panorama images that include the entire panoramic scene in higher pixel resolution. In some smart panorama examples referred to as "personalized smart panorama" and using personalized prioritization, a smart panorama includes higher resolution image data of ROIs that include particular objects that have a high value to a particular user.

In another example referred to as "smartshot", method 300 or method 350 may be performed while a user captures a single regular image as known in the art. One or more higher pixel resolution images including higher resolution image data ("smartshot images" in the following) are captured simultaneously with the single lower pixel resolution image. In some smartshot examples, the smartshot images may be shown (or "displayed") to a user separately from the single regular image. In other smartshot examples, higher resolution image data may be fused into the single lower pixel resolution image, wherein the higher pixel resolution image data is pinned a particular location within the lower pixel resolution image. It is noted here that the steps of method 300 or method 350 may be performed automatically (or "autonomously). Autonomous smartshot capture is beneficial, as compared to a scenario where a user captures a single lower pixel resolution image, the user does not have to perform any additional action for capturing the smartshot, but still receives both the single lower pixel resolution image and, in addition, smartshot images including ROIs of a scene in higher pixel resolution. In some smartshot examples referred to as "personalized smartshot" and using personalized prioritization, a smartshot includes higher resolution image data of ROIs that include particular objects that have a high value to a particular user.

In another example referred to as "video smartshot", method 300 or method 350 may be performed while a user captures a regular video stream as known in the art. One or more smartshot images are captured simultaneously with the capture of the lower pixel resolution video stream. In some video smartshot examples, the smartshot images may be shown to a user separately from the lower pixel resolution video stream. In other video smartshot examples, smartshot image data may be fused into the lower pixel resolution video stream. It is noted here that the steps of method 300 or method 350 may be performed autonomously. Autonomous video smartshot capture is beneficial, as compared to a scenario where a user captures a regular video stream, the user does not have to perform any additional action for capturing the video smartshot, but still receives both the lower pixel resolution video stream and, in addition, smartshot images including ROIs of a scene in higher pixel resolution.

In another example referred to as "panning image", method 300 or method 350 may be performed while a user captures a single lower pixel resolution image as known in the art or a video stream as known in the art of a scene that includes a moving object selected for panning ("selected moving object" in the following) and a background. The selected moving object may represent a ROI in the scene and may move relative to a mobile device used for capturing a panning image, or vice versa, a mobile device used for capturing a panning image may move relative to a selected moving object. In a first sub-step for capturing a panning image, a plurality of higher pixel resolution images of first sensor segment 202 are captured so that they include the selected moving object. In general and as of the movement, the selected moving object may be located at different positions within first sensor segment 202. In some examples, first sensor segment 202 may be moved as well while capturing first sensor segment 202, e.g. to keep the selected moving object within first sensor segment 202. A background may be included in first sensor segment 202, or it may be included in second sensor segment 204. As detailed below, in a final (or "output") image displayed to a user, the background will be blurred, so that a resolution with which the background is captured is in general of relatively low important. Therefore, it may be beneficial to include as much of the background as possible into second sensor segment 204, and only include segments of the background in first sensor segment 202 which are relatively close to the selected moving object.

In a second sub-step, the plurality of higher pixel resolution images are aligned to obtain a plurality of aligned higher pixel resolution images. The alignment is done so that the selected moving object is located at a same image position. This implies that objects of the background are not located at a same image position, but at different positions. The change in position is defined by the degree (or "amount" or "velocity") of relative movement between the selected moving object and the mobile device. In a third sub-step, one single panning image is created by overlaying the aligned higher pixel resolution images. In the panning image, the selected moving object is not blurred, but the objects of the background are blurred, i.e. a blurred background is created. The degree (or amount) of blur is defined (1) by the degree of relative movement between the selected moving object and the mobile device and (2) by the capture time (or duration) of the panning image. I general, a longer capture time is associated with a larger (or "higher") plurality of higher pixel resolution images captured in the first sub-step. A panning image is beneficial to highlight motion occurring in a scene, e.g. to highlight a moving object. In some examples, a plurality of moving objects may be present in the scene, e.g. two or even three moving objects, and more than one of the plurality of moving objects may be selected for panning. In the following, this is referred to as "multi-object panning". In a first method for multi-object panning, in a first sub-step for capturing a multi-object panning image, a plurality of higher pixel resolution images of first sensor segment 202 are captured so that they include the same background and all selected moving objects located at different positions within first sensor segment 202. In some examples of multi-object panning, a size of first sensor segment 202 may be scaled so that it includes all the selected moving objects. In other examples of multi-object panning, more than one sensor segment operated in HRM may be captured. For example, if there are two selected moving objects, two higher pixel resolution images of two different sensor segments may be captured. If there are three selected moving objects, three higher pixel resolution images having three different sensor segments may be captured, etc.

In a second sub-step, one particular object out of the selected moving objects is selected by a user or automatically, i.e. by an algorithm. The plurality of higher pixel resolution images is aligned to obtain a plurality of aligned higher pixel resolution images. The alignment is done so that the one particular object is located at a same position within an output frame. The alignment implies that objects of the background are not located at a same image position, but at different image positions. Here, the background includes also the selected moving objects except the one particular object. In a third sub-step, one single panning image is created by overlaying the aligned higher pixel resolution images. In the panning image, the one particular selected moving object is not blurred, but the objects of the background are blurred. After creating a panning image that includes the one particular selected moving object which is not blurred, a user may want to create an additional panning image, e.g. showing a second particular selected moving object which is not blurred. For this and based on the higher pixel resolution images captured in the first sub-step, in the second sub-step another particular object out of the selected moving objects is selected by a user or automatically. The plurality of higher pixel resolution images is aligned to obtain a plurality of aligned higher pixel resolution images. The alignment is done so that the another particular object is located at a same image position. The alignment implies that objects of the background are not located at a same position within the output frame. Here, the background includes also the selected moving objects except the another particular object. In a third sub-step, one single panning image is created by overlaying the aligned higher pixel resolution images. In the panning image, the another particular selected moving object is not blurred, but the objects of the background are blurred. In this manner several panning images can be created based on a same plurality of higher pixel resolution images captured in the first sub-step. In a video stream, there may be a gradual (or "smooth") transition between different selected moving objects that are not blurred. This means that in a first video stream segment, a first particular object out of the selected moving objects is shown not blurred (with background shown blurred), in a second video stream segment, a second particular object out of the selected moving objects is shown not blurred (with background shown blurred), etc. The different video stream segments may be all displayed (or "rendered") at a same frame rate, or they may be displayed at different frame rates.

In other examples referred to as "long exposure", in a second sub-step, the alignment may be done so that the background objects are located at a same position within an image. This implies that the selected moving object is not located at a same position within the image. In a third sub-step, one single long exposure image is created by overlaying the aligned higher pixel resolution images. In the long exposure image, the background is not blurred, but a blurring of the selected moving object is created. The degree of blur is defined by the degree of relative movement between the selected moving object and the mobile device.

In a yet another example referred to as "super-image", in a first step, method 300 or method 350 may be performed repetitively (or sequentially) to capture a FOV segment $FOV_{SI}$ in higher pixel resolution which is significantly larger than first sensor segment 202, i.e. $FOV_{SI}$>first sensor segment 202. This is achieved by sequentially repeating step 312 or step 362 for capturing a plurality of higher pixel resolution images, each higher pixel resolution image of the plurality of higher pixel resolution images covering a different $FOV \leq FOV_{SI}$, so that the plurality of higher pixel resolution images covers entire $FOV_{SI}$. In a second step, the plurality of higher pixel resolution image is combined (or stitched) or fused so that an image covering entire $FOV_{SI}$ in higher pixel resolution is created.

A yet another example referred to as "Portrait Bokch" relates to applying further image processing after capturing first sensor segment 202. For example, for Portrait Bokch only the one or more ROIs included in first sensor segment 202 may be used (or may remain) in higher pixel resolution as captured in step 312 or step 362. FOV segments of first sensor segment 202 that do not include the one or more ROIs may be artificially blurred. The blurring may be a Gaussian blurring or another blurring as known in the art. For example, a ROI may be a face or a body of a person. In Portrait Bokch, the face or the body of the person may not be blurred, whereas all FOV segments not including the face or the body of the person may be blurred. In general, Portrait Bokeh represents an aesthetic photography feature.

A yet another example referred to as "Face hiding" also relates to applying further image processing after capturing first sensor segment 202 and/or second sensor segment 204. For example, for Face hiding, all faces or one or more of all faces in first sensor segment 202 and/or second sensor segment 204 may be hidden. Here and in the following, "hiding" a face means that image data including features of the face or the entire face may be processed so that the person shown in the image cannot be identified based on the image data including the hidden face. Hiding a face may be achieved by blurring a FOV segment including the face, or it may be achieved by replacing the image data showing the face with image data showing a different object, for example an "emoji". In some examples ("personalized face hiding"), not all faces in a scene may be hidden, but only a particular selection of faces may be hidden. Personalized prioritization may be used to decide which face is hidden and which face is not. For example, only faces of often captured persons may not be hidden, but all other faces may be hidden. Face hiding may be beneficial for preserving a privacy of a person. In general, Face hiding represents a privacy-preserving photography feature.

A yet another example referred to as "Object tracking boost" relates to selecting one or more ROIs in step 306 and step 356. As part of a scene analysis in step 304 or step 354, for object tracking boost one may use information obtained from an image processing method for performing object tracking ("object tracking methods"). For example, neural network based object tracking methods such as Vision transformers ("ViT") known in the art deploy a so called "attention mechanism" that classifies (or "ranks") FOV segments according to their importance for tracking a particular ROI. This classification may be used to select ROIs that are to be captured in higher pixel resolution. For example, a FOV segment which is classified as important (relative to other FOV segments) for tracking a particular ROI by an object tracking method, may be captured in higher pixel resolution. This can beneficially impact a performance of the object tracking method, because the higher resolution image data used by the object tracking method includes more details on the particular ROI compared to lower resolution image data. In other words, it can boost (or improve) capabilities of object tracking methods.

A yet another example referred to as "Audio zoom" relates to applying further audio processing after capturing a video stream including one or more ROIs in higher pixel resolution. A sound stream may be recorded alongside the video stream. For example, in the sound stream, a sound that is associated with (or "belongs to") a ROI may be artificially enhanced compared to a sound not associated with an ROI.

A yet another example referred to as "post-capture image orientation" relates to applying further image processing after capturing first sensor segment 202. This feature is for example beneficially used in digital media such as social media, which often request (or "require") a particular ratio of image height and image width when publishing images, i.e. a particular width/height ratio. After capturing first sensor segment 202, a user may for example desire to publish the scene, but the higher pixel resolution image may have been captured in a width/height ratio that is different from a particular width/height ratio that is requested by the digital media. A user may cut (or crop) the higher pixel resolution image so that it fits the requested particular width/height ratio, but this may be undesired as not all image data included in the higher pixel resolution image can be used. Amongst others for preventing this disadvantage, in post-capture image orientation as disclosed herein, a program (or "algorithm") such as generative artificial intelligence ("Generative AI") may be used to generate (or "invent") new image data that is used to generate a new image that has a $FOV_N$ which is larger than a FOV of the higher pixel resolution image. The new image may for example include all image data of the higher pixel resolution image, and in addition it may also include the new ("generated") image data. The new image data may complete (or "complement") image data of the higher pixel resolution image, for example so that the new image fits the particular width/height ratio that is requested by the digital media. The generation of the new image data may be performed by a processor included in a mobile device operational to perform post-capture image orientation, or it may be generated outside of the mobile device, e.g. in a cloud. In some examples, for generating the new image data, other image data may be used. For example, lower resolution image data that includes parts of or the entire $FOV_N$ may be used. In these examples, one may also speak of "up-sampling" image data or performing "super resolution" on image data, instead of speaking of "generating" new image data.

Figure 4:
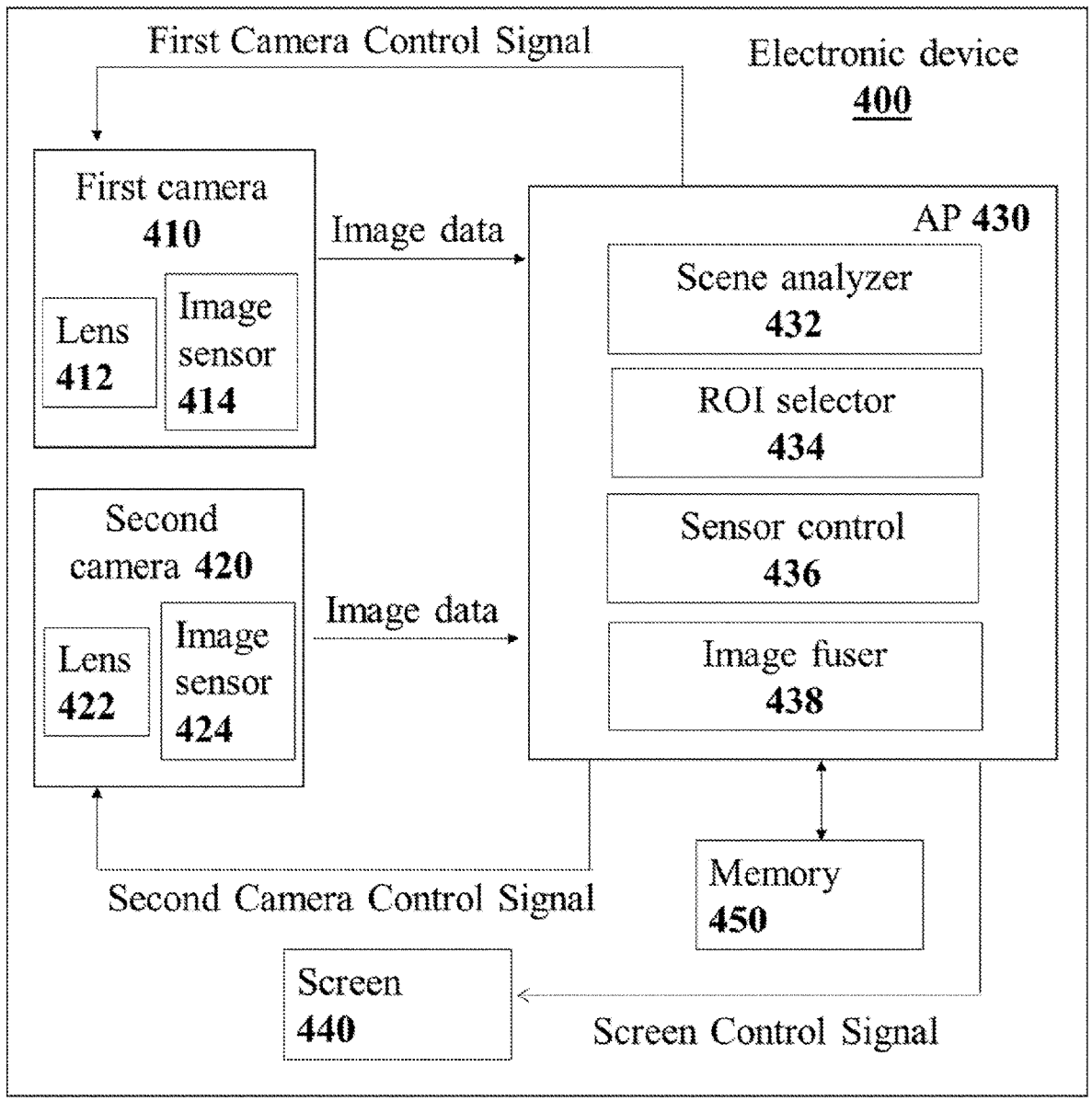
FIG. 4 shows schematically an embodiment of a mobile device configured to perform methods disclosed herein.

FIG. 4 shows schematically an embodiment of a mobile device (for example, a smartphone) numbered 400 configured to perform methods disclosed herein. Mobile device 400 comprises a first camera 410 having a first camera field-of-view $FOV_1$ and including a first lens 412 and a first image sensor 414. First image sensor 414 is a binning sensor. Optionally, mobile device 400 further comprises a second camera 420 having a second camera field-of-view $FOV_2$ and including a second lens 422 and a second image sensor 424. Second image sensor 424 may be or may not be a binning sensor. In general, $FOV_2 > FOV_1$ may be fulfilled. In some examples, first camera 410 may be a Wide camera with $FOV_1$=60-100 deg and an effective focal length ("EFL") of $EFL_1$=3 mm-10 mm, and optional second camera 420 may be an Ultra-Wide camera with $FOV_2$=100-180 deg and an of $EFL_2$=1.5 mm-7.5 mm.

Mobile device 400 further includes an application processor (AP) 430. AP 430 includes a scene analyzer 432 configured to analyze image data of a scene to provide scene information, a ROI selector 434 configured to prioritize objects detected by scene analyzer 432, a sensor control 436 configured to configure a binning sensor, i.e. to move a sensor segment in HRM of a binning sensor such as binning sensor 414, and an image fuser 438 configured to perform image fusion as described in step 314 and in step 364.

Mobile device 400 further includes a screen 440 for displaying information. Screen 440 may be a touchscreen, configured to detect a particular location that a user touches. Mobile device 400 further includes a memory 450, e.g. for storing image data of an image gallery, or for storing calibration data between first camera 410 and second camera 420. In other examples, calibration data between first camera 410 and second camera 420 may be stored at a memory associated with (or "included in") first camera 410 and/or second camera 420, e.g. an electrically erasable programmable read-only memory ("EEPROM").

Mobile device 400 may further include several additional sensors to capture additional information. For example, an additional sensor may be a microphone or even a directional microphone, a location sensor such as GPS, an inertial measurement unit (IMU) etc.

Figure 5A:
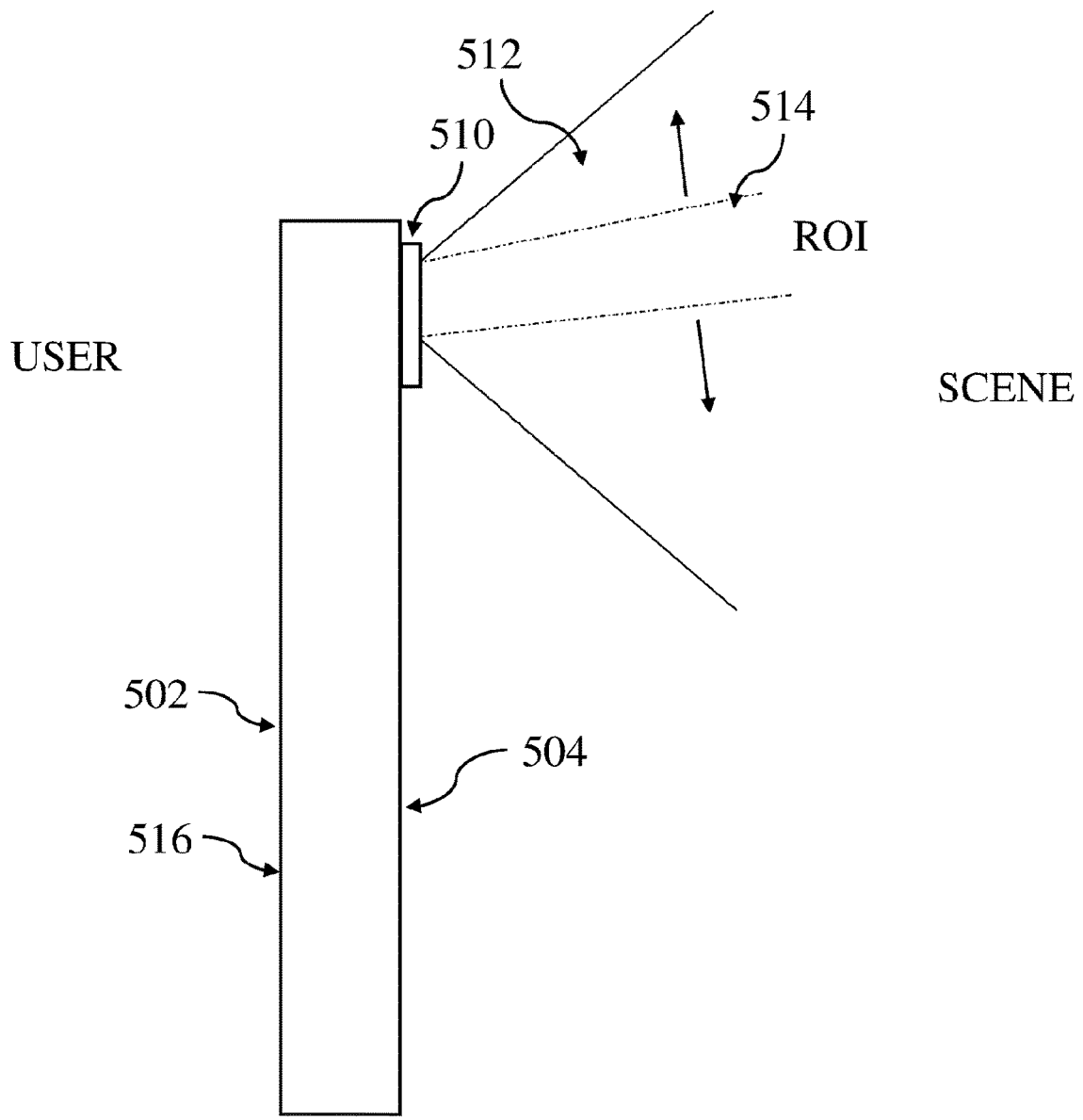
FIG. 5A shows schematically a mobile device configured to perform single-camera maximum resolution capturing) disclosed herein.

FIG. 5A shows schematically a mobile device (for example, a smartphone) numbered 500 configured to perform single-camera maximum resolution capturing (see FIG. 3A) disclosed herein. Mobile device 500 has a front surface 502 which is in general pointed towards a user. Mobile device 500 has a rear surface 504 which is in general pointed towards a scene that a user captures. Front surface 502 includes a screen 516. Rear surface 504 includes a rear (or "world-facing") camera 510 including a binning sensor, such as first camera 410. Camera 510 has a FOV 512 which in general is captured in binning resolution and operational to capture an entire scene. FOV 512 includes a FOV segment 514 which in general is captured in higher pixel resolution and operational to capture one or more ROIs. As indicated by the arrows, FOV segment 514 may be moved or scanned within FOV 512. In some examples, the scanning of FOV segment 514 is performed according to an analysis of lower resolution image data that covers a scene included in FOV 512.

Figure 5B:
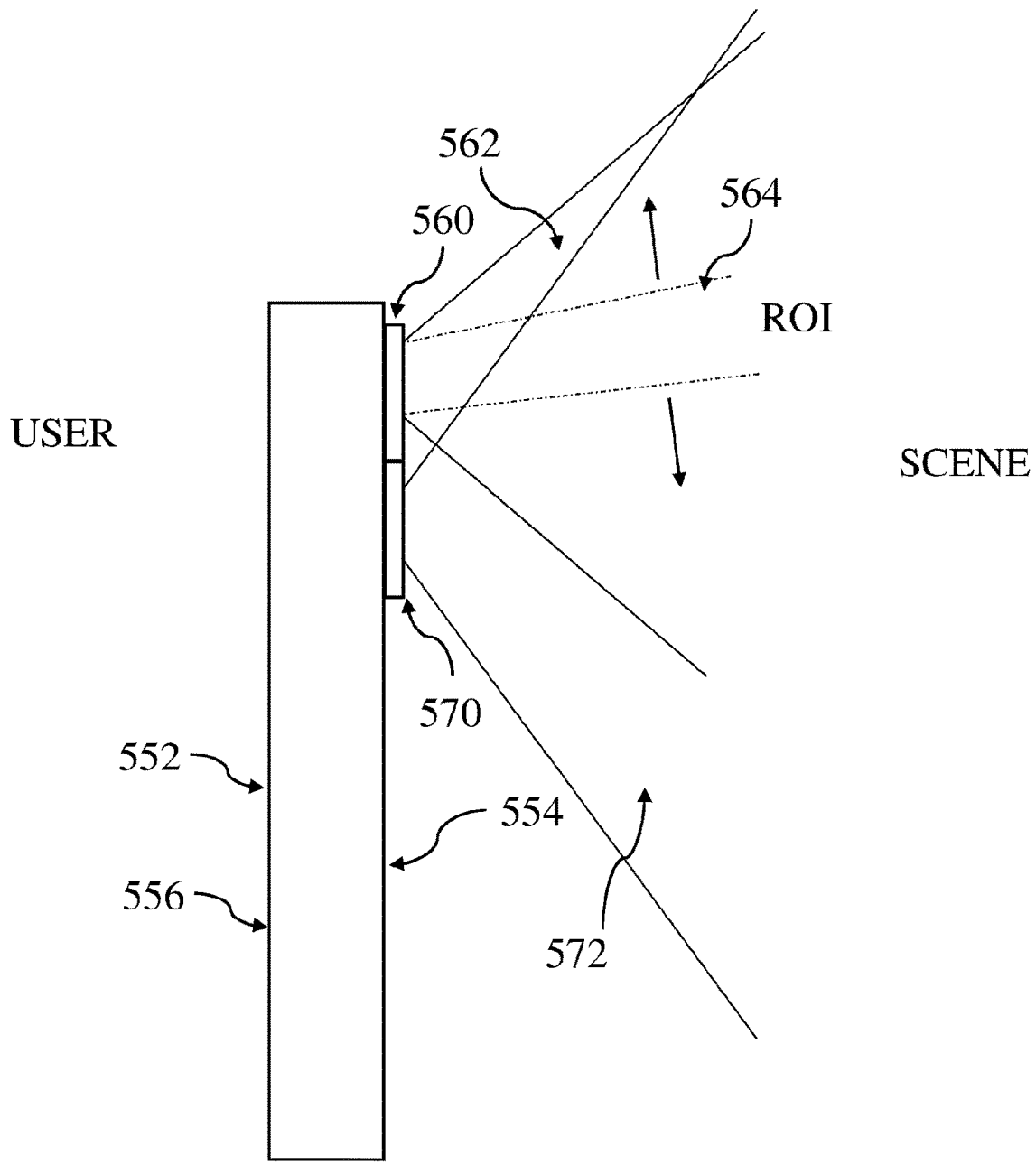
FIG. 5B shows schematically a mobile device configured to perform dual-camera maximum resolution capturing disclosed herein.

FIG. 5B shows schematically a mobile device (for example, a smartphone) numbered 550 configured to perform dual-camera maximum resolution capturing (see FIG. 3B) disclosed herein. Mobile device 5050 has a front surface 552 and a rear surface 554. Front surface 552 includes a screen 556. Rear surface 554 includes a first rear camera 560 including a binning sensor, such as first camera 410. Rear surface 554 further includes a second rear camera 570 including an image sensor which may be or may not be a binning sensor, such as second camera 420. Camera 560 has a FOV 562 that includes a FOV segment 564 which in general is captured in higher pixel resolution and operational to capture one or more ROIs. As indicated by the arrows, FOV segment 564 may be moved or scanned within FOV 562. In some examples, the scanning of FOV segment 564 is performed according to an analysis of lower resolution image data that covers a scene included in FOV 572.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A camera system, comprising:
   a camera having an effective focal length EFL=3 mm-10 mm and a field-of-view FOV=60-100 deg and including an image sensor having an image sensor area, wherein the image sensor is configured to perform pixel binning to switch between a lowest pixel resolution mode and one or more higher pixel resolution modes (HRMs), wherein the image sensor is configurable to adjust a pixel binning arrangement to operate a first segment of the image sensor area in one of the one or more HRMs for capturing higher pixel resolution image data; and
   a processor configurable to analyze image data of the camera, to select a region of interest (ROI) in a scene viewed by the FOV, and to configure the image sensor to selectively reduce or disable pixel binning within the selected ROI so that the selected ROI is included in the first segment of the image sensor area and is captured in the higher pixel resolution while maintaining or activating pixel binning in non-ROI areas.

2. The camera system of claim 1, wherein the image sensor area includes a rectangular zoom area that is smaller than the image sensor area by 1.5× or more, wherein the first segment is included in the zoom area, wherein a center of the image sensor area is identical to a center of the zoom area.

3. The camera system of claim 1, wherein the image sensor is configurable to not operate any segment of the image sensor area that is not included in the first segment.

4. The camera system of claim 1, wherein the lowest pixel resolution mode corresponds to a full sensor pixel resolution in the range of 11 to 13 megapixel.

5. The camera system of claim 1, wherein each of the one or more HRMs corresponds to a full sensor pixel resolution equal to or larger than 45 megapixel.

6. The camera system of claim 1, wherein the one HRM corresponds to a full sensor pixel resolution in the range of 45 to 55 megapixel.

7. The camera system of claim 1, wherein the one HRM corresponds to a full sensor pixel resolution in the range of 95 to 120 megapixel.

8. The camera system of claim 1, wherein the one or more HRMs include two HRMs, and wherein the first segment is operated in a higher HRM of the two HRMs.

9. The camera system of claim 8, wherein the higher HRM of the two HRMs corresponds to a full sensor pixel resolution in the range of 180 to 220 megapixel.

10. The camera system of claim 8, wherein the image sensor is configurable to operate a second segment of the image sensor area in the lower HRM of the two HRMs for capturing lower HRM image data.

11. The camera system of claim 1, wherein the one or more HRMs include two HRMs, and wherein the first segment is operated in a lower HRM of the two HRMs.

12. The camera system of claim 11, wherein the lower HRM of the two HRMs corresponds to a full sensor pixel resolution in the range of 45 to 55 megapixel.

13. The camera system of claim 1, wherein the one or more HRMs include three HRMs, and wherein the first segment is operated in a highest HRM of the three HRMs.

14. The camera system of claim 13, wherein the highest HRM of the three HRMs corresponds to a full sensor pixel resolution in the range of 350 to 450 megapixel.

15. The camera system of claim 13, wherein the image sensor is configurable to operate a second segment of the image sensor area in an intermediate of the three HRMs for capturing intermediate HRM image data or in a lower of the three HRMs for capturing lower HRM image data.

16. The camera system of claim 1, wherein the one or more HRMs include three HRMs, and wherein the first segment is operated in an intermediate HRM of the three HRMs.

17. The camera system of claim 16, wherein the intermediate HRM of the three HRMs corresponds to a full sensor pixel resolution in the range of 95 to 120 megapixel.

18. The camera system of claim 16, wherein the image sensor is configurable to operate a second segment of the image sensor area in a lower of the three HRMs for capturing lower HRM image data.

19. The camera system of claim 1, wherein the one or more HRMs include three HRMs, and wherein the first segment is operated in a lowest HRM of the three HRMs.

20. The camera system of claim 19, wherein the lowest HRM of the three HRMs corresponds to a full sensor pixel resolution in the range of 45 to 55 megapixel.

21. The camera system of claim 1, wherein the image sensor is configurable to operate a second segment of the image sensor area in the lowest pixel resolution mode for capturing lowest resolution image data.

22. The camera system of claim 1, wherein the image sensor is configured to perform 4-binning.

23. The camera system of claim 1, wherein the image sensor is configured to perform 9-binning.

24. The camera system of claim 1, wherein the image sensor is configured to perform 16-binning.

25. The camera system of claim 1, wherein the image sensor is configured to perform 36-binning.

26. The camera system of claim 1, further comprising a second camera having a second FOV ($FOV_2$) and including a second image sensor configured to capture $FOV_2$, wherein the configuration to select a ROI includes a configuration to analyze image data of the second camera.

27. The camera system of claim 26, wherein $FOV_2 \geq FOV$.

28. The camera system of claim 26, wherein the second camera has a second effective focal length $EFL_2$=1.5 mm-7.5 mm and a second field-of-view $FOV_2$=100-180 deg.

29. The camera system of claim 26, wherein the camera system is operational to perform dual-camera maximum resolution capturing.

30. The camera system of claim 26, wherein the camera system is configured to capture dual resolution images.

31. The camera system of claim 1, wherein an image including the selected ROI captured in higher pixel resolution has a pixel count in the range of 2.5 to 55 megapixel.

32. The camera system of claim 1, wherein an image including the selected ROI captured in higher pixel resolution has a pixel count in the range of 11 to 13 megapixel.

33. The camera system of claim 1, wherein the image sensor is configurable to capture a video stream of the first segment of the image sensor area in higher pixel resolution.

34. The camera system of claim 33, wherein the video stream is captured in 8k pixel count.

35. The camera system of claim 33, wherein the video stream is captured in 4k pixel count.

36. The camera system of claim 33, wherein the video stream is captured in 2k pixel count.

37. The camera system of claim 33, wherein the video stream is captured at a frame rate in the range of 15 to 500 frames per second.

38. The camera system of claim 33, wherein the video stream is captured at a frame rate in the range of 15 to 60 frames per second.

39. The camera system of claim 33, wherein the camera system is configured to capture a dual resolution video stream.

40. The camera system of claim 1, wherein the camera system is included in a smartphone.

41. The camera system of claim 1, wherein the camera system is included in a tablet.

* * * * *